United States Patent [19]
Ohtsuki

[11] Patent Number: 5,654,845
[45] Date of Patent: Aug. 5, 1997

[54] CASSETTE TAPE PLAYER

[75] Inventor: Akira Ohtsuki, Iwaki, Japan

[73] Assignee: Alpine Electronics, Inc., Tokyo, Japan

[21] Appl. No.: 630,911

[22] Filed: Apr. 4, 1996

[30]     Foreign Application Priority Data

Apr. 17, 1995 [JP] Japan ................... 7-091104

[51] Int. Cl.$^6$ ............................................. G11B 15/675
[52] U.S. Cl. ......................................... 360/96.5; 360/137
[58] Field of Search ............................... 360/96.5, 96.6, 360/105, 137

[56]                References Cited

U.S. PATENT DOCUMENTS

| | | | |
|---|---|---|---|
| 4,704,643 | 11/1987 | Matsuoka et al. | 360/96.5 |
| 4,739,424 | 4/1988 | Yamada et al. | 360/96.5 |
| 5,029,025 | 7/1991 | Wada | 360/96.1 |
| 5,105,320 | 4/1992 | Hayashi | 360/105 |

*Primary Examiner*—Robert S. Tupper
*Attorney, Agent, or Firm*—Guy W. Shoup; Norman R. Klivans, Jr.

[57]                ABSTRACT

A cassette tape player includes a cassette carrying mechanism which conveys a cassette tape between the insertion position and the hold position of the player automatically, a mode selection lever which reciprocates depending on various operational modes, and a drive motor which drives the cassette carrying mechanism and the mode selection lever, a lock mechanism which selectively prevents the movement of the mode selection lever or the cassette carrying mechanism, and a planetary gear mechanism coupled between the drive motor and the mode selection lever and the cassette carrying mechanism. The planetary gear mechanism includes a sun gear rotated by the drive motor, a ring gear which steadily meshes with one of a first rack provided on the mode selection lever and a second rack provided on the cassette carrying mechanism, and a carrier which steadily meshes with another of the first rack and second rack. The lock mechanism selectively prevents the movement of the mode selection lever or the cassette carrying mechanism so that the driving force of the drive motor applied to the sun gear is released from only one of the ring gear and the carrier. The cassette tape player is capable of driving the cassette carrying mechanism and the mode selection lever reliably and enables the cassette tape player to be compact.

21 Claims, 23 Drawing Sheets

F I G. 25a
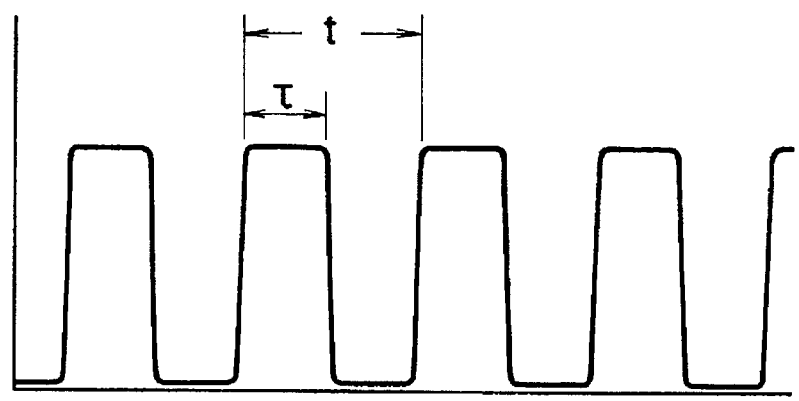
F I G. 25b
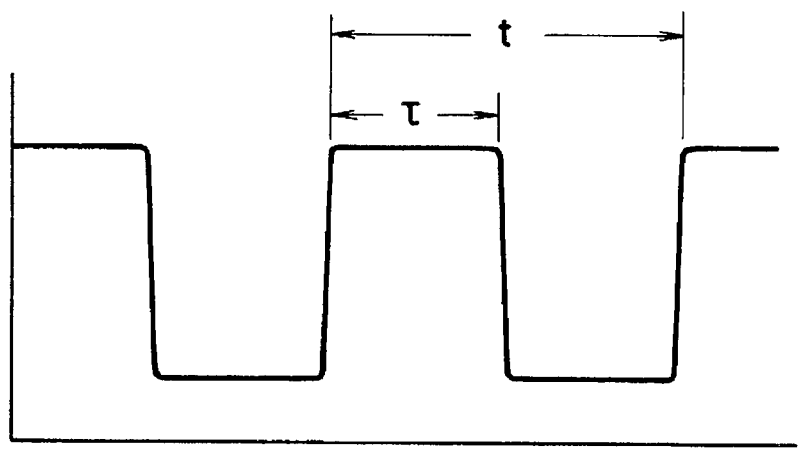

CASSETTE TAPE PLAYER

BACKGROUND OF THE INVENTION

1. Field of the Invention

The present invention relates to a cassette tape player, and particularly to a drive mechanism which moves, with a single motor, the cassette carrying mechanism which conveys a cassette tape in the player automatically and the mode selection lever which switches an operational mode of the player.

2. Description of the Prior Art

Cassette tape players for use in vehicles generally employ cassette carrying mechanisms. The cassette carrying mechanism automatically loads a cassette tape, which has been put halfway into the player, to the cassette hold position, and automatically ejects the cassette tape from the hold position. The cassette tape player further includes a reciprocating drive mechanism for moving a mode selection lever depending on the selected mode and a drive mechanism for rotating the reel bases in certain directions and at certain speeds depending on the mode.

All of these mechanisms are driven by a single motor by operation of idler gears provided between the motor and the drive mechanisms and associated electromagnetic solenoids which operate the idler gears. For example, at loading or ejecting a cassette tape, a solenoid operates on the idler gear between the motor and the cassette carrying mechanism to transmit the output torque of the motor to the cassette carrying mechanism.

However, a cassette carrying mechanism based on the operation of idler gears is likely to cause gear noise when an idler gear meshes with another gear in the transmission mechanism, and to fail to engage an idler gear with another gear due to faulty operational timing.

A drive mechanism that overcomes these problems is disclosed in U.S. Pat. No. 5,105,320. The cassette tape player disclosed therein is designed to keep the motor drive gear engage with the rack of the mode selection lever which is linked to the cassette carrying mechanism by a cam member. In operation, when the mode selection lever moves for a certain distance with the rotation of the Rotor, the cassette carrying mechanism performs the loading operation or ejecting operation through the cam member during the movement, and when the mode selection lever further moves an additional distance, another mechanism operates during the movement of the mode selection lever.

Although that conventional cassette tape player eliminates the gear noise and faulty gear meshing by retaining the motor drive gear in engagement with the rack of mode selection lever, the rack that is commonly used for moving the cassette carrying mechanism and other mechanisms must be very long, making the compact design of the cassette tape player difficult. Moreover, the cam member for driving the cassette carrying mechanism must be disposed between the mode selection lever and the cassette carrying mechanism, resulting in a complex and costly mechanism.

SUMMARY

The present invention is intended to cope with the foregoing prior art shortcomings, and its prime goal is to provide a cassette tape player capable of driving the cassette carrying mechanism and mode selection lever noiselessly and reliably, and which also enables the drive mechanism to be compact.

To achieve this, the present invention is directed to a cassette tape player having a cassette carrying mechanism which conveys a cassette tape between an insertion position and hold position of the player, a mode selection lever which reciprocates depending on the operational mode, and a drive motor which drives the cassette carrying mechanism and mode selection lever, where the player further includes a lock mechanism which selectively precludes the movement of the mode selection lever or cassette carrying mechanism, and a planetary gear mechanism located between the drive motor and the mode selection lever and cassette carrying mechanism and which consists of a sun gear rotated by the drive motor, a ring gear which steadily meshes with one of a first rack provided on the mode selection lever a second rack provided on the cassette carrying mechanism, and a carrier which steadily meshes with another of the first rack and second rack, the lock mechanism operating selectively to preclude the movement of the mode selection lever or cassette carrying mechanism so that the driving force of the drive motor applied to the sun gear is released from only one of the ring gear and the carrier.

In operation, when the drive motor rotates, the rotation applied to the sun gear of the planetary gear mechanism is delivered selectively by the ring gear or carrier as the output gear to the mode selection lever or cassette carrying mechanism. For example, during the cassette tape loading or ejecting operation, the torque of the drive motor is transmitted only to the cassette carrying mechanism by way of one output gear, and during FF (fast feed) or playback operation, the motor torque is transmitted only to the mode selection lever by way of another output gear.

The lock mechanism is switched depending on the rotational direction of the drive motor when the cassette tape is in the hold position of the player, and it precludes the mode selection lever from moving during the operation of the cassette carrying mechanism or precludes the cassette carrying mechanism from moving during the operation of the mode selection lever.

BRIEF DESCRIPTION OF THE DRAWINGS

FIGS. 25A and 25B are waveform diagrams of the pulse signals produced by the optical sensors at the end of the slack eliminating operation;

DETAILED DESCRIPTION

Figure 1:
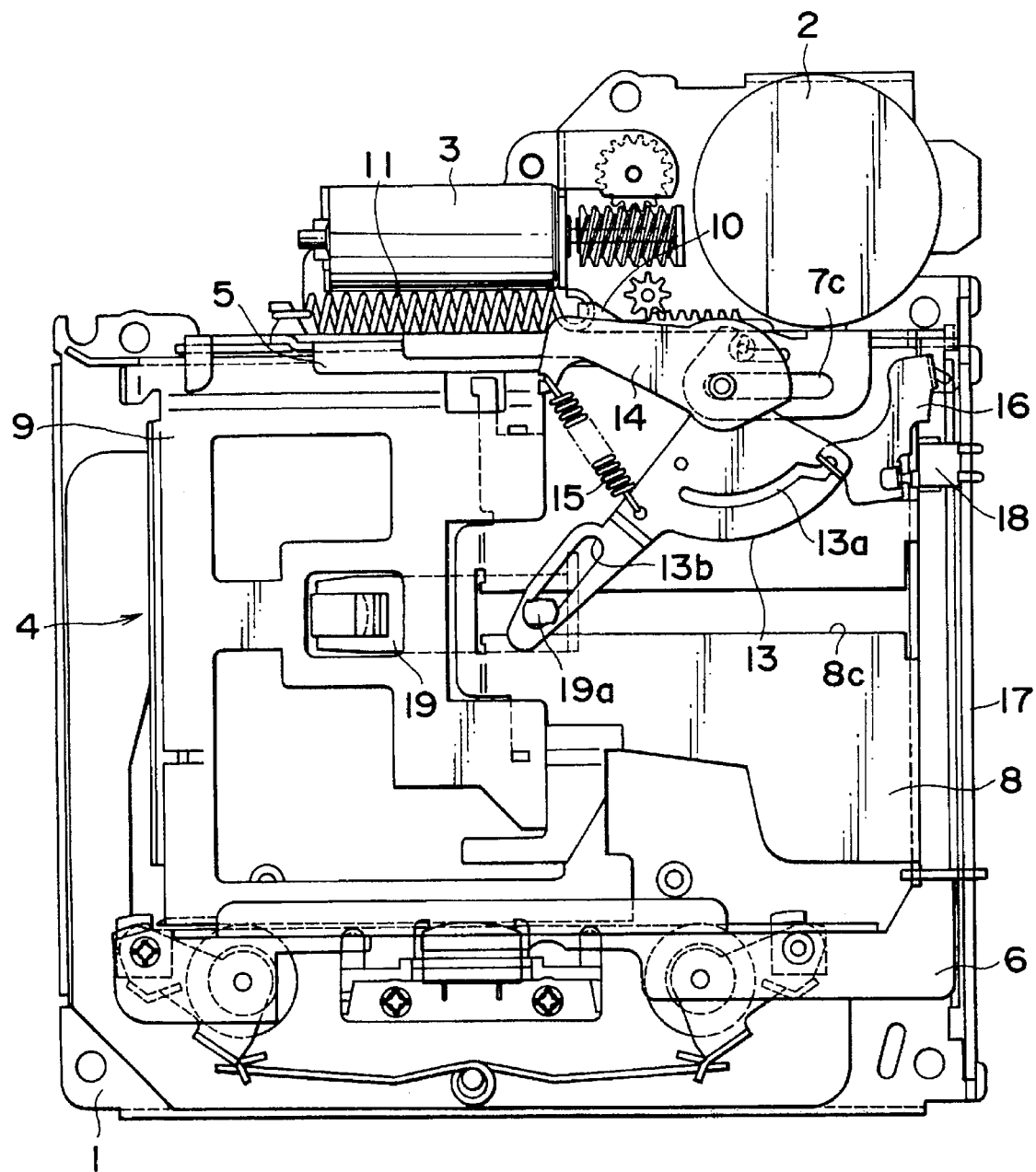
FIG. 1 is a plan view of a cassette tape player based on an embodiment of this invention, in the state of the end of cassette tape ejection.

An embodiment of this invention is explained with reference to the drawings. FIGS. 1 through 14 show a flat chassis 1, on which is mounted a main motor 2 which rotates in one direction at a high speed or a low speed, an auxiliary motor 3 which rotates in both directions at a constant speed, and a cassette carrying mechanism 4.

In FIGS. 1 through 4, the cassette carrying mechanism 4 includes two side plates 5 and 6 fixed to the chassis 1, a slide plate 7 located outside of one side plate 5, a plate base 8 supported rotatably between the side plates 5 and 6, and a cassette holder 9 connected to one end of the plate base 8. The cassette carrying mechanism 4 is driven by the auxiliary motor 3.

The side plate 5 defines a guide hole 5a and two guide bosses 5b, and the slide plate 7 defines a cam hole 7a and two long holes 7b. The slide plate 7 is supported slidable by the side plate 5. At the lower end of the slide plate 7, a block member 10 is fixed to the slide plate 7 by means of an extension spring 11, with a first rack 10a formed in the external surface of the block member 10.

Attached to the plate base 8 are a shaft 8a and a roller 8b. The shaft 8a is fitted rotatably on the side plates 5 and 6, and the roller 8b is attached to run through the guide hole 5a of the side plates 5 and engage the cam hole 7a of the slide plate 7. The slide plate 7 on its upper surface defines a long hole 7c and an L-shaped slit 7d, and a pin 12 which runs through the long hole 7c is fixed on the upper surface of the side plates 5. A first ejection arm 13 and second ejection arm 14 are pivoted on the pin 12. These ejection arms 13 and 14 are held at a constant angle by means of a boss (not shown) and a extension spring 15, and a pin 14a which is fitted vertically on the second ejection arm 14 engages with the slit 7d.

The first ejection arm 13 defines a cam hole 13a and a long hole 13b, and part of a detecting lever 16 engages the cam hole 13a. The detecting lever 16 is supported rotatably on the upper surface of the side plates 5, and it confronts a cassette insertion detecting switch 18 mounted on a printed circuit board 17. A boss 19a of a slider 19 is inserted in the long hole 13b of the first ejection arm 13, and it can move back and forth along a guide groove 8c formed on the upper surface of the plate base 8.

Figure 5:
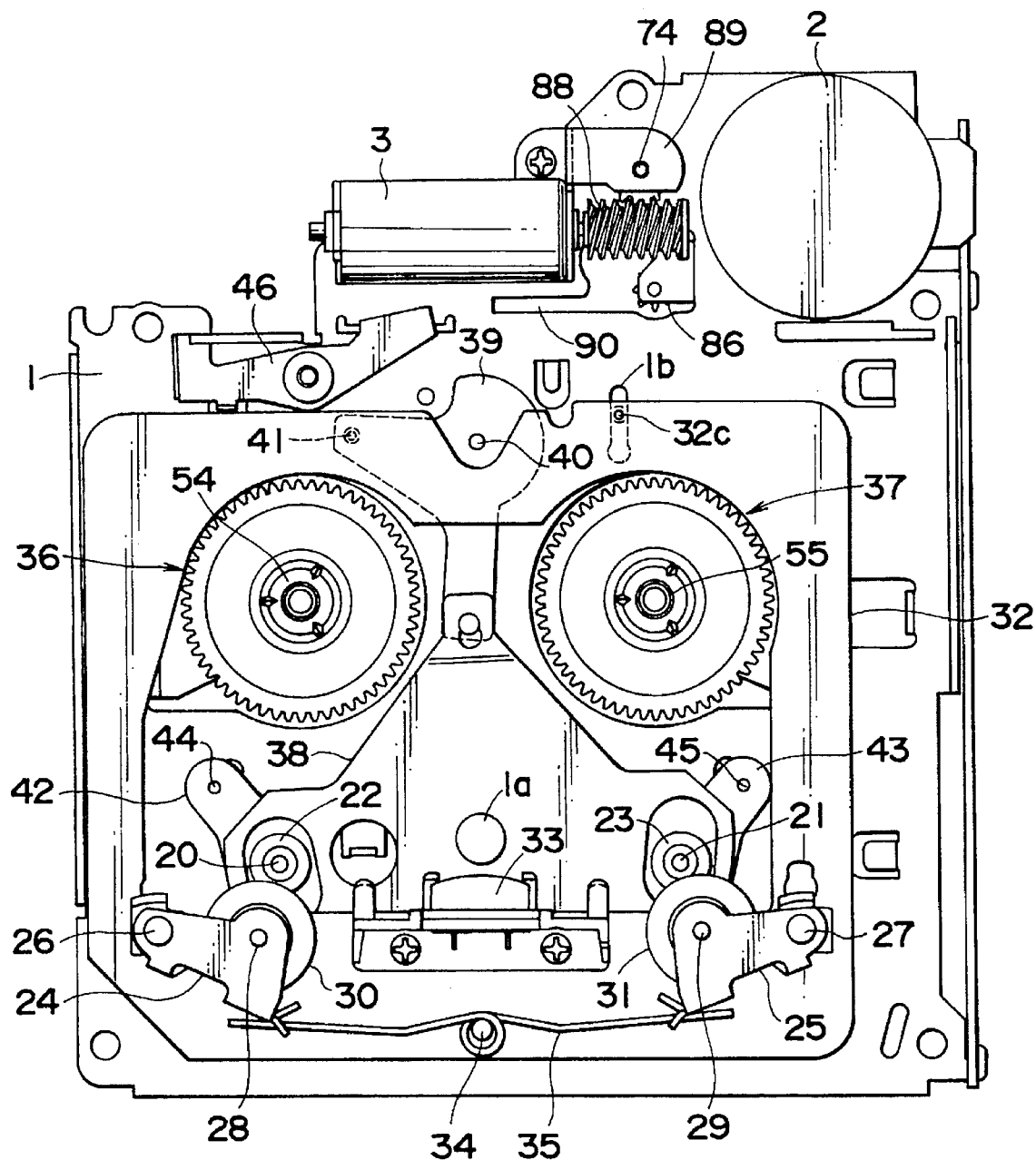
FIG. 5 is a plan view of the cassette tape player, with the cassette carrying mechanism removed.

As shown in FIG. 5, a pair of capstan shafts 20 and 21 are supported rotatably by bearings 22 and 23 on the surface of the chassis 1, and a pair of pinch levers 24 and 25 are supported rotatably by pivots 26 and 27. Pinch rollers 30 and 31 are supported rotatably by pivots 28 and 29 on the pinch levers 24 and 25 so that the pinch rollers 30 and 31 come in contact with and move away from the respective capstan shafts 20 and 21 in response to turning of the pinch levers 24 and 25.

On the chassis 1, there is placed a head base 32, which can reciprocate by being guided in the up/down direction of FIG. 5. A magnetic head 33 is fixed on the head base 32, and a pin 34 is attained on the head base 32. The pinch rollers 30 and 31 are spring-biased toward the capstan shafts 20 and 21 by means of a line spring 35 held by the pin 34.

The head base 32 has the shape of a square frame, in which is disposed two reel bases 36 and 37 and a selection lever 38. The selection lever 38 is supported rotatably by a boss 1a which protrudes on the chassis 1, and it is coupled at the end with a selection arm 39 with a pin. The selection arm 39 is located between the chassis 1 and the head base 32 and supported rotatably by a pivot 40 on the chassis 1. A pin 41 fitted vertically on the selection arm 39 runs through the chassis 1 and exits from its rear surface. Accordingly, when the selection arm 39 turns on the pivot 40, the selection lever 38 turns on the boss 1a in the direction opposite to the selection arm 39.

A pair of idler levers 42 and 43 are disposed between the chassis 1 and the selection lever 38, and these idler levers 42 and 43 are supported rotatably by the outer surface of the bearings 22 and 23. The idler levers 42 and 43 each define at one end the cam holes 42a and 43a (see FIG. 8) and pivots 44 and 45 are fitted vertically on the other ends of idler lever 42 and 43. These pivots 44 and 45 run through holes formed in the chassis 1 and exit from its rear surface. On the chassis 1, there is pivoted a type identifying lever 46 for identifying the type of cassette tape T, and part of the lever 46 runs through the chassis 1 and exits from its rear surface.

Figure 6:
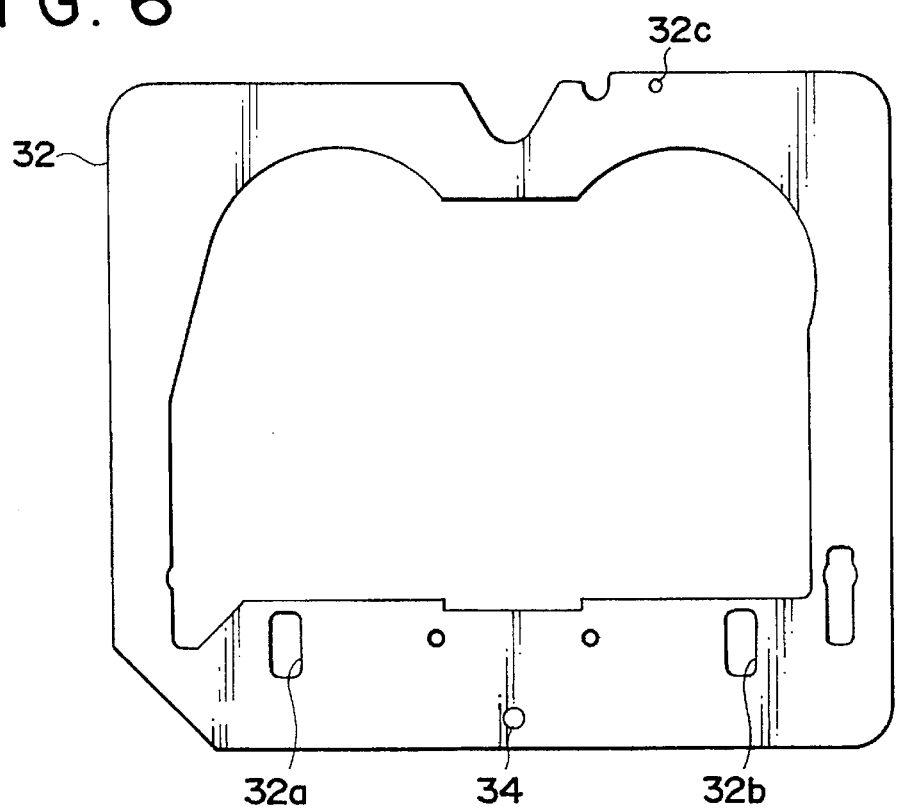
FIG. 6 is a plan view of the head base of the cassette tape player.

As shown in FIG. 6, the head base 32 defines in its lower section two long holes 32a and 32b. The head base 32 is also provided in its upper section with a pin 32c, which runs vertically through a guide hole 1b formed in the chassis 1 and exits from the rear surface of the chassis 1.

Figure 7:
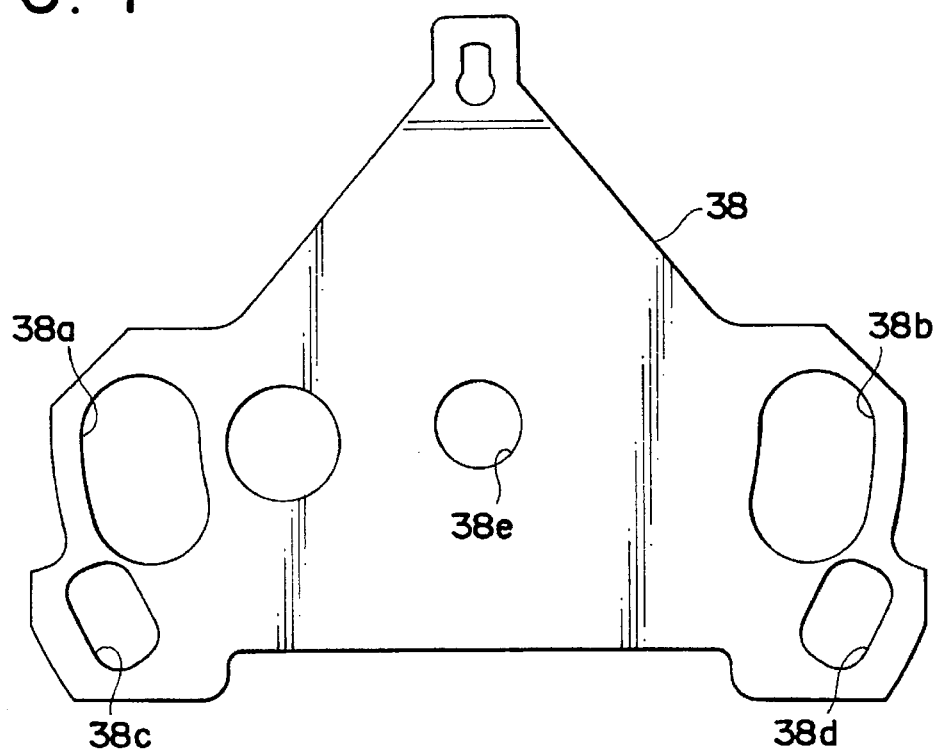
FIG. 7 is a plan view of the selection lever of the cassette tape player.

As shown in FIG. 7, the selection lever 38 defines two through-holes 38a and 38b, two cam holes 38c and 38d, and a circular hole 38e. The circular hole 38e is fitted rotatably on the boss 1a of the chassis 1, and bearings 22 and 23 are fitted in the through-holes 38a and 38b. The pivots 28 and 29 have their lower ends passing through the long holes 32a and 32b, the cam holes 38c and 38d of the selection lever 38 and the cam holes 42a and 43a of the idler levers 42 and 43, and reaching the rear surface of the chassis 1. The pivots 28 and 29 are spring biased by the line spring 35 toward the upper ends of the long holes 32a and 32b.

Figure 8:
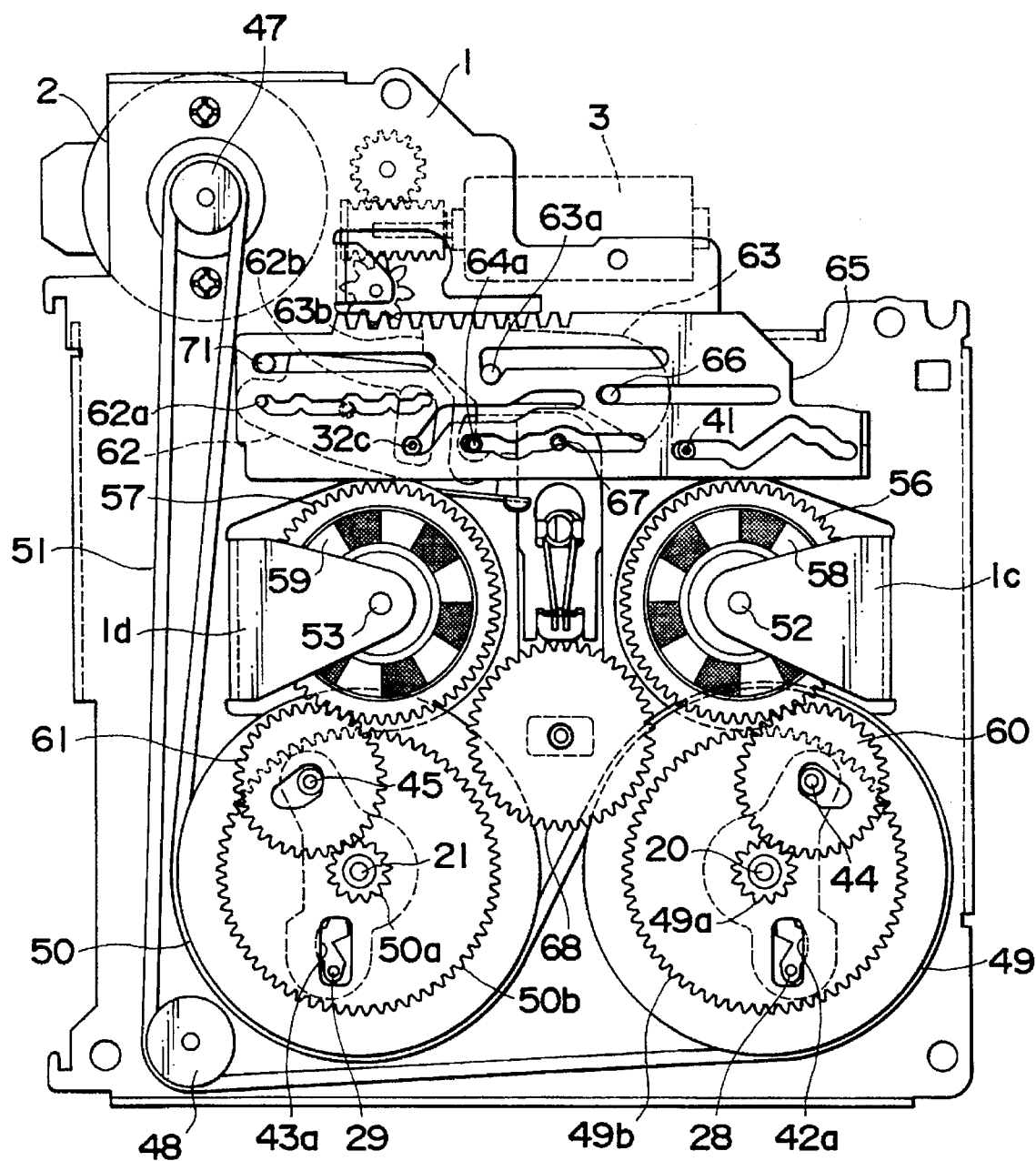
FIG. 8 is a bottom view of the cassette tape player seen from the rear of the chassis.

As shown in FIG. 8, the main motor 2 has its drive shaft extending to the rear side of the chassis 1, and a pulley 47 is attached on the end of the shaft. Another pulley 48 and two flywheels 49 and 50 are attached rotatably on the rear surface of the chassis 1, and a belt 51 is around the flywheels 49 and 50 and pulleys 47 and 48. The capstan shafts 20 and 21 are fixed at the center of the flywheels 49 and 50, and the flywheels 49 and 50 have small gears 49a and 50a and large gears 49b and 50b formed concentrically at the center of the capstan shafts 20 and 21. The chassis 1 on its rear surface defines two support lugs 1c and 1d, which support shafts 52 and 53, by which the reel bases 36 and 37 are pivoted.

Figure 9:
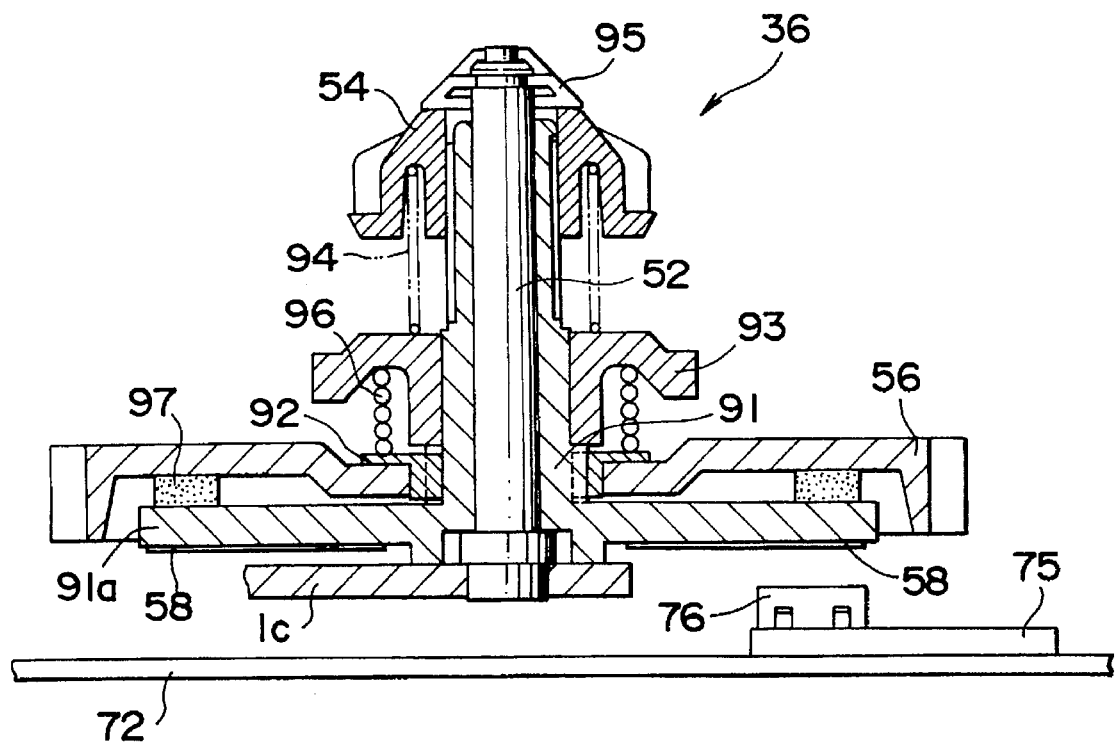
FIG. 9 is a cross-sectional view of the reel base of the cassette tape player.

As shown in FIG. 9, one reel base 36 includes a transmission member 91 supported rotatably by the shaft 52, a reel gear 56 supported rotatably by the lower section of the transmission member 91 through a bearing 92, a spring receptacle 93 which is press-fitted in the middle of the transmission member 91, and a coupling member 54 which is in spline engagement with the upper section of the transmission member 91. One reel of the cassette tape T couples with the coupling member 54.

The transmission member 91 has on its lower end a disc section 91a, with a rotation detecting disc 58 being on the rear surface thereof. The rotation detecting disc 58 has reflective and non-reflective portions formed alternately in the circumferentially.

A first spring 94 is fitted between the spring receptacle 93 and the coupling member 54, by which the coupling member 54 is pushed upward to a washer 95 which stops it. A second spring 96 is fitted between the spring receptacle 93 and the bearing 92, and a slip member 97 made of felt or the like is fitted between the reel gear 56 and the disc section 91a of the transmission member 91. The reel gear 56 is pushed by being intervening slip member 97 to the disc section 91a of the transmission member 91 by the downward resilient force of the second spring 96.

Another reel base 37 has the same structure as the reel base 36, although the details are not shown in the figure, and has a coupling member 55 to be coupled with another reel of the cassette tape T (see FIG. 5), a reel gear 57, rotation detecting plate 59, etc.

On the rear side of the chassis 1, there are disposed two idler gears 60 and 61, and these gears are pivoted by the pivots 44 and 45 on the idler levers 42 and 43 and are covered by the flywheels 49 and 50. The idler gears 60 and 61 always engage with the small gears 49a and 50a of the flywheels 49 and 50, and engage with or disengage from the reel gears 56 and 57 depending on the operation of the idler levers 42 and 43.

Further disposed on the rear side of the chassis 1 are a position detecting lever 62, a lock lever 63, a selection swing 64, and a mode selection lever 65 which covers all or part of these parts. The position detecting lever 62 is supported rotatably by a pivot 62c on the chassis 1. The position detecting lever 62 has a pin 62a and a through-hole 62b, and the pin 32c of the head base 32 runs through the guide hole 1b of the chassis 1 and this through-hole 62b and engages with a cam hole (explained later) in the mode selection lever 65.

Figure 14:
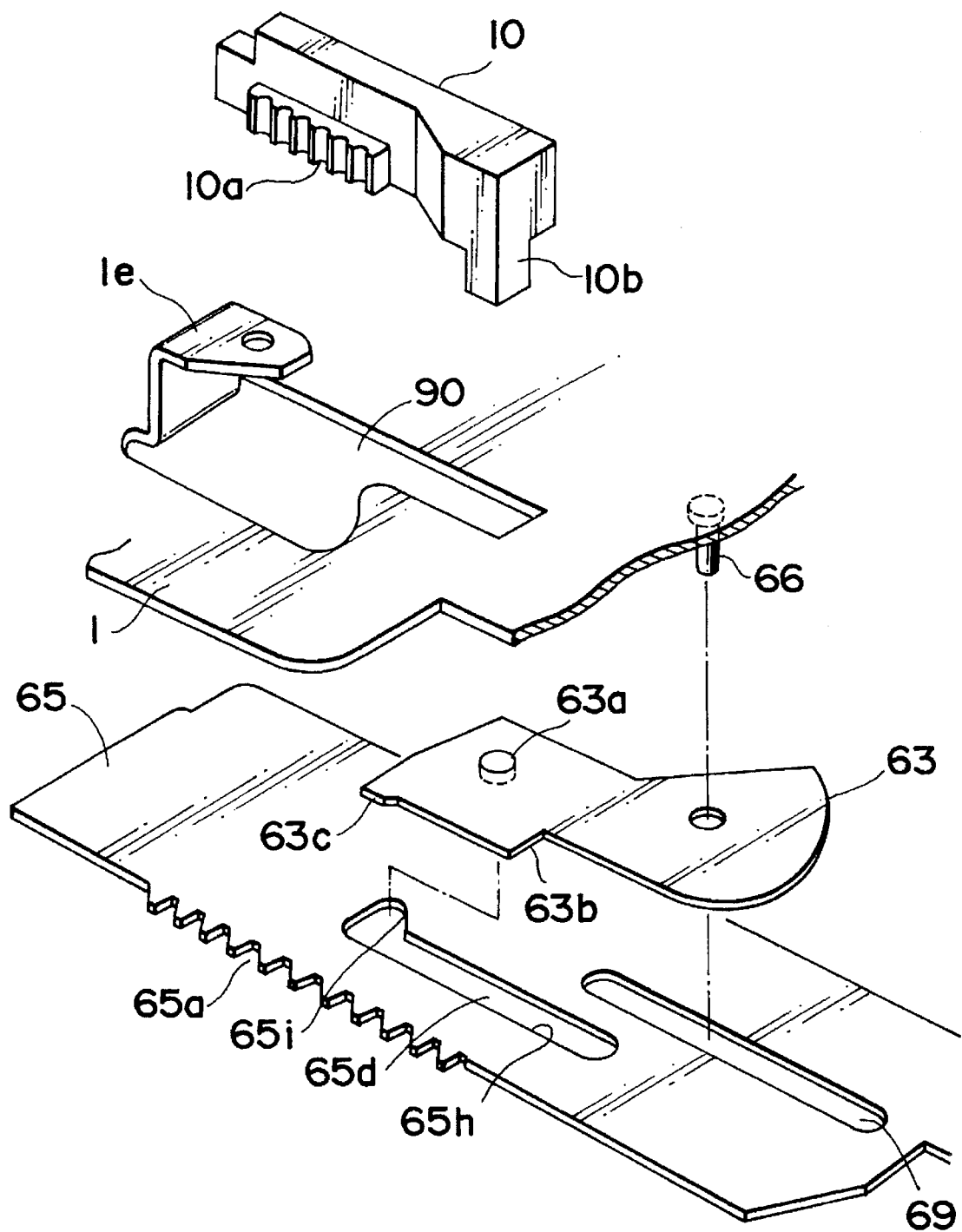
FIG. 14 is a perspective view showing disassembled the principal parts of the torque transmission mechanism.

The lock lever 63 has a pin 63a and a stopper 63b, which on one end defines a small boss 63c as shown in FIG. 14. The lock lever 63 is supported rotatably by a pin 66 on the chassis 1. The selection swing 64 is attached rotatably by a pivot 67 on the chassis 1, and it has a pin 64a on its upper end. On its lower end, a swing gear 68 is attached rotatably. The swing gear 68 is located between the reel gears 56 and 57, and it engages with one reel gear 56 and the large gear 49b of the flywheel 49, or with another reel gear 57 and the large gear 50b of the flywheel 50 selectively in response to the operation of the selection swing 64.

Figure 10:
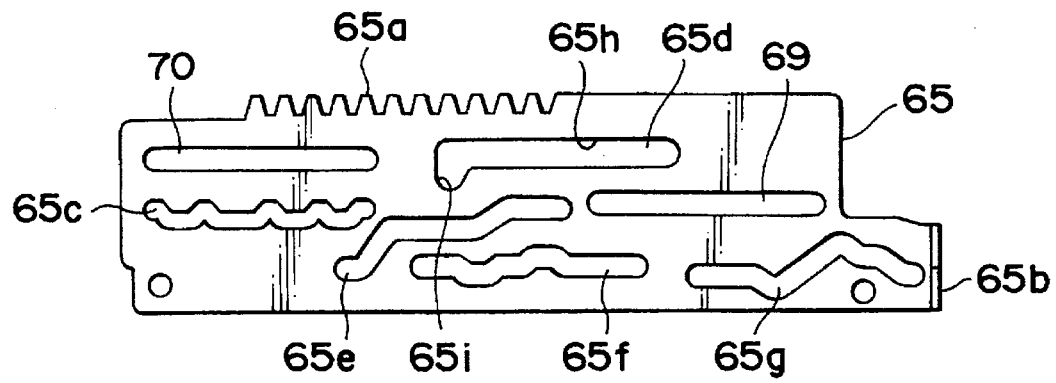
FIG. 10 is a bottom view of the mode selection lever of the cassette tape player.
Figure 11:
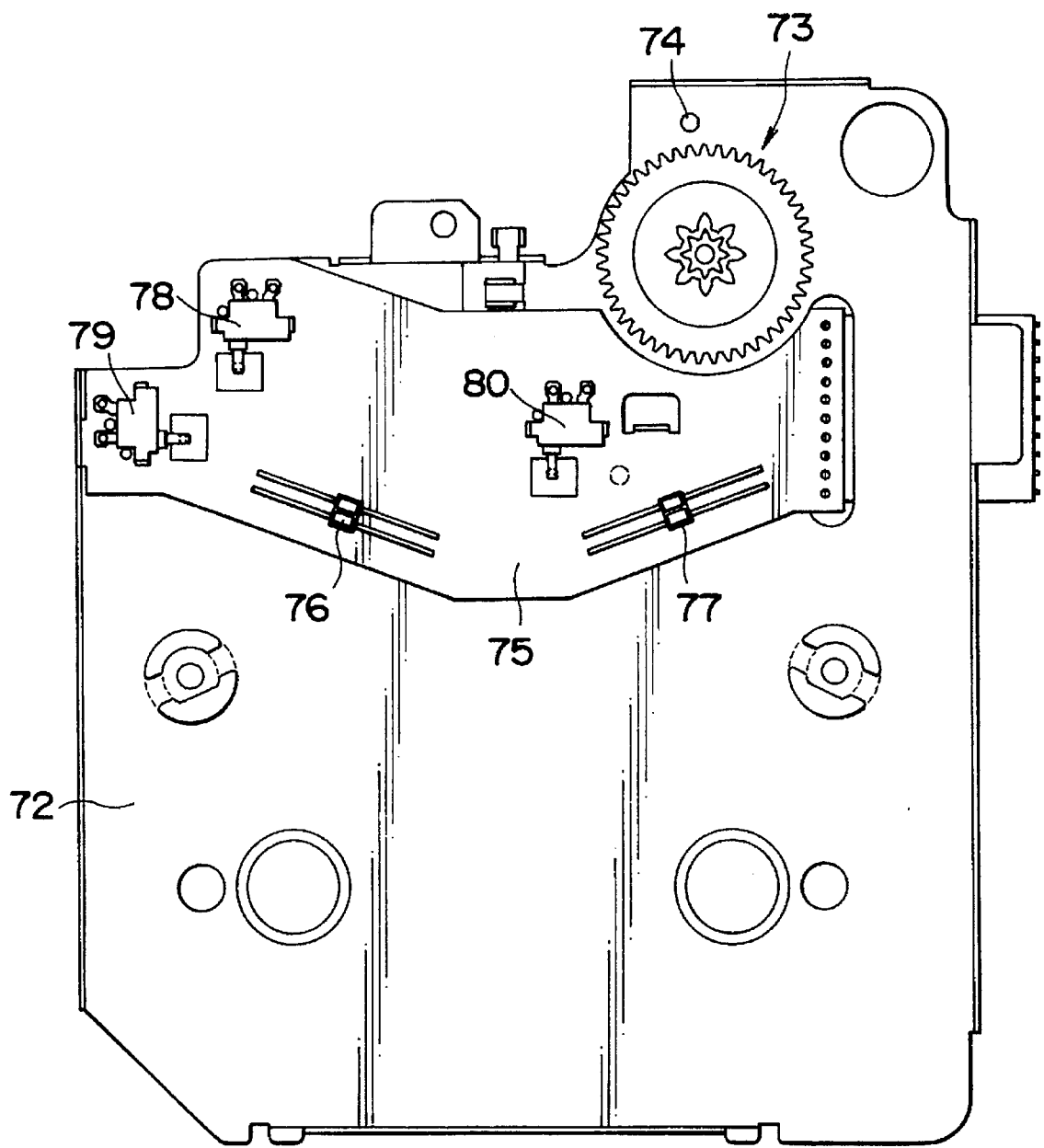
FIG. 11 is a plan view of the support plate of the cassette tape player seen from the top.

As shown in FIG. 10, the mode selection lever 65 defines two guide holes 69 and 70 which extend in the longitudinal direction, with the pin 66 and another pin 71 being inserted in these guide holes 69 and 70, and the mode selection lever 65 which is driven by the auxiliary motor 3 is fitted so that it can reciprocate in the right/left direction in FIG. 8 relative to the chassis 1. The mode selection lever 65 defines a second rack 65a in part of its upper edge, a bent formation of a pushing lug 65b in one side edge, and a plurality of cam holes 65c–65g in its flat section.

The cam hole 65c engages the pin 62a of the position detecting lever 62 the cam hole 65d engages the pin 63a of the lock lever 63, the cam hole 65e engages the pin 32c of the head base 32, the cam hole 65f engages the pin 65g of the selection swing 64, and the cam hole 65g engages the pin 41 of the selection arm 39. The cam holes 65c–65g and the respective pins have their relative positions varied in response to the reciprocal motion of the mode selection lever 65 for selecting various operational modes which will be explained later. The cam hole 65d which engages the pin 63a of the lock lever 63 has a parallel section 65h which extends along the moving direction of the mode selection lever 65 and a step section 65i which is formed as a continuous end section of the parallel section 65h to extend in the direction virtually perpendicular to the lever moving direction.

On the rear side of the chassis 1, there is fixed a support plate 72, on which a planetary gear mechanism 73, shaft 74 and printed circuit board 75 are attached. Two optical sensors 76 and 77 each having a light emitting element and a light receiving element as a unit are mounted on the printed circuit board 75. The optical sensors 76 and 77 are located to confront the rotation detecting discs 58 and 59, with a certain spacing being provided between them (see FIG. 9). Accordingly, as the rotation detecting discs 58 and 59 rotate, the respective optical sensors 76 and 77 produce pulse signals, and the rotational states of the reel gears 56 and 57 are detected based on the pulse signals. Further mounted on the printed circuit board 75 are a tape type identifying switch 78 operated by the identifying lever 46, a reference position detecting switch 79 operated by the pushing lug 65b of the mode selection lever 65, and a mode detecting switch 80 operated by the position detecting lever 62.

Figure 12:
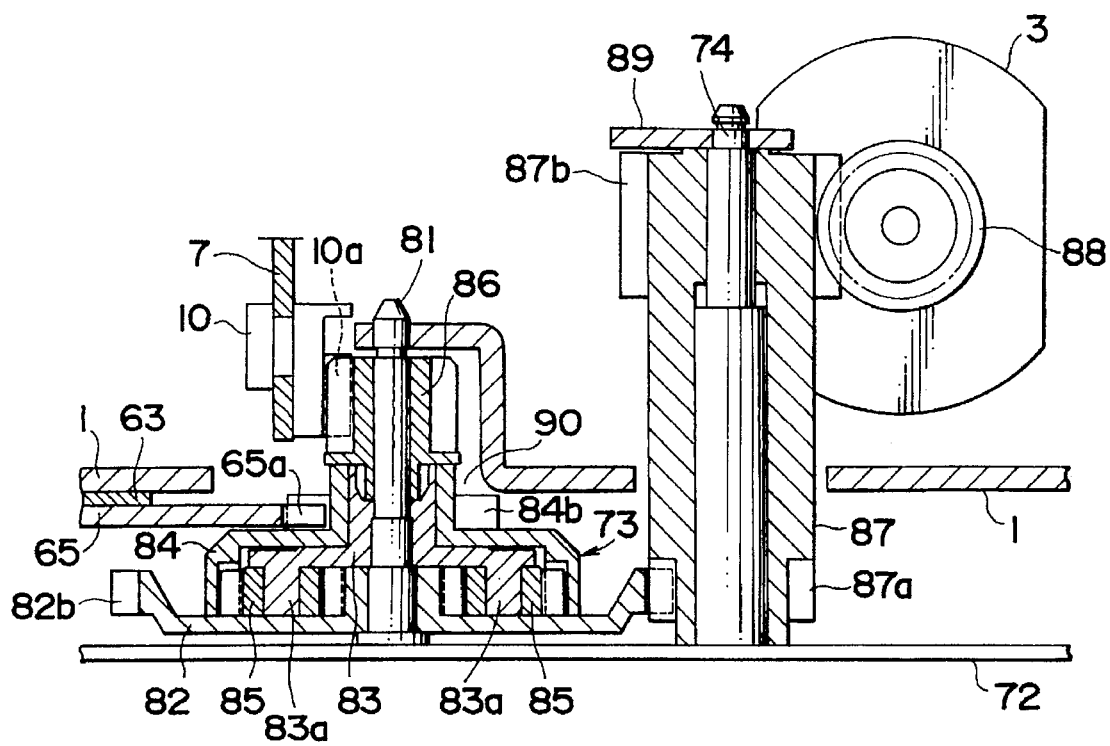
FIG. 12 is a cross-sectional view of the torque transmission mechanism of the auxiliary motor of the cassette tape player.
Figure 13:
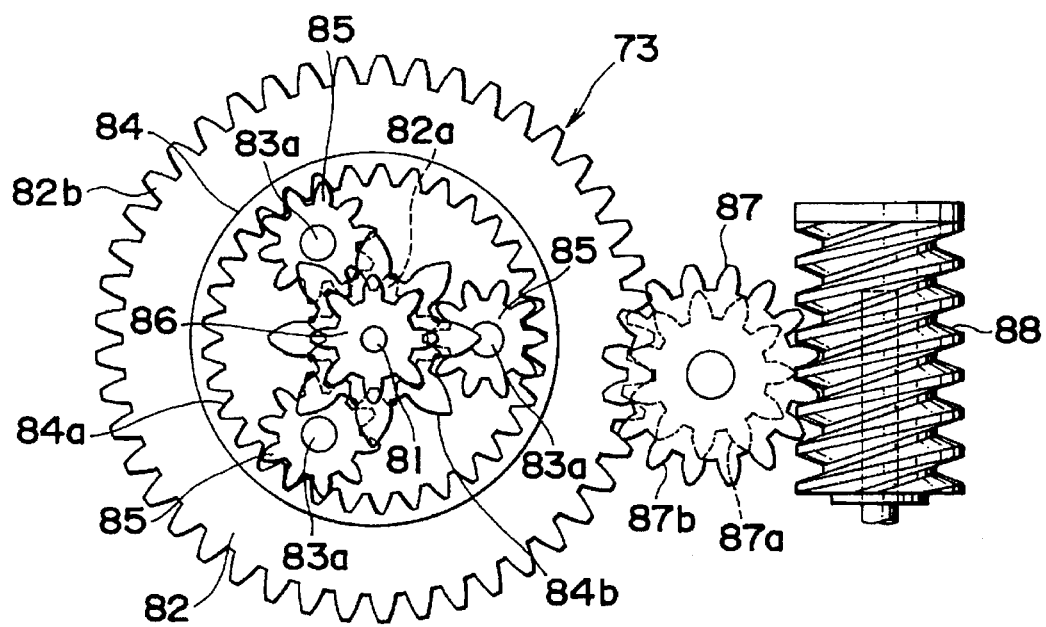
FIG. 13 is a view of the planetary gear mechanism used in the torque transmission mechanism.

As shown in FIGS. 12 and 13, the planetary gear mechanism 73 includes a sun gear 82 pivoted by a pin 81 standing on the support plate 72, a carrier 83 pivoted by the pin 81, a ring gear 84 fitted rotatably on the carrier 83, and three planetary gears 85 supported rotatably by pivots 83a on the carrier 83. The planetary gears 85 mesh with the inner teeth 82a of the sun gear 82 and the inner teeth 84a of the ring gear 84.

The sun gear 82 and ring gear 84 define outer teeth 82b and 84b, respectively, and a gear 86 is press-fitted to the upper end of the carrier 83. The outer teeth 82b of the sun gear 82 mesh with teeth 87a formed in the lower end of a cylindrical member 87, which is pivoted by the shaft 74. The cylindrical member 87 protrudes from the upper surface of the chassis 1, and teeth 87b formed in its upper end mesh with a worm gear 88 fixed on the drive shaft of the auxiliary motor 3.

The auxiliary motor 3 is attached to the surface of the chassis 1 by bracket 89, and the upper end of the shaft 74 is supported by the bracket 89. The outer teeth 84b of the ring gear 84 mesh with the second rack 65a of the mode selection lever 65, and the gear 86 fixed to the carrier 83 runs through an opening 90 formed in the chassis 1 and meshes with the first rack 10a of the block member 10 on the upper side of the chassis 1.

As shown in FIG. 14, there is formed at the edge of the opening 90 a bent section 1e for supporting the upper end of the pin 81. A meshing boss 10b formed on the block member 10 runs through the opening 90 and protrudes to the rear side of the chassis 1. The first rack 10a of the block member 10 and the second rack 65a of the mode selection lever 65 extend in parallel on both sides of the chassis 1, and the stopper 63b of the lock lever 63 is movable in the opening 90 (within the range of motion of the meshing boss 10b of the block member 10).

Figure 15A:
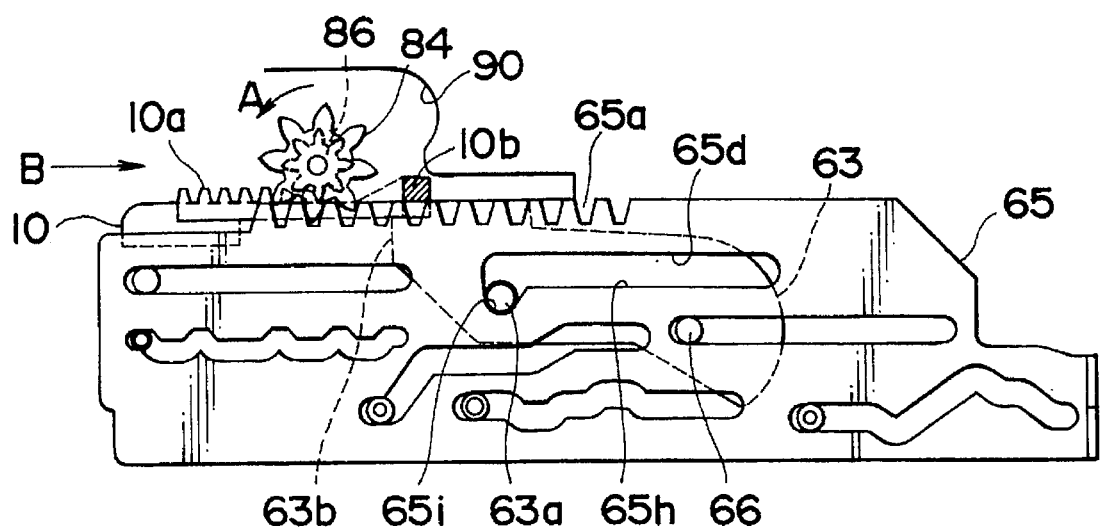
FIGS. 15A and 15B are views showing the switching operation of the torque transmission mechanism, with FIG. 15A being the end of cassette tape ejection and FIG. 15B being the end of cassette tape loading.

The sun gear 82 of the planetary gear mechanism 73 serves for the input shaft, and the carrier 83 and ring gear 84 serve for the output shafts, so that the torque of the auxiliary motor 3 applied to the sun gear 82 is transmitted to one of the output shafts (carrier 83 and ring gear 84) depending on the position of the lock lever 63. Specifically, as shown in FIG. 15A, in case the pin 63a of the lock lever 63 engages the step 65i of the cam hole 65d, the mode selection lever 65 is stopped by the lock lever 63 and located at the first lock position.

The stopper 63b has its end plane virtually aligned with the tooth tips of the second rack 65a of the mode selection lever 65 and the block member 10 has its meshing boss 10b in contact with a small boss 63c at the end of the stopper 63b, and therefore the stopper 63b does not rotate in the direction of exposure in the opening 90 and the lock lever 63 is retained at the first lock position by the meshing boss 10b. Based on the press-contact of the meshing boss 10b of the block member 10 to the small boss 63c of the lock lever 63, the lock lever 63 is prevented from having a backlash motion in the rotational direction, and this prevents the generation of rattle noise even in the presence of vibration.

In this state, when the auxiliary motor 3 starts rotating, the rotation is transmitted by the worm gear 88 and cylindrical member 87 to the sun gear 82 of the planetary gear mechanism 73, and the sun gear 82 rotates. At this time, the ring gear 84 has its outer teeth 84b meshing with the second rack 65a of the mode selection lever 65, and it does not rotate. Consequently, the planetary gears 85 spin to go around the pin 81, and the rotation of the sun gear 82 is transmitted to the carrier 83. As a result, the carrier 83 and gear 86 rotate in the direction indicated by the arrow A in FIG. 15A, causing the first rack 10a which meshes with the gear 86 to move in the direction indicated by the arrow B, and the slide plate 7 attached on the block member 10 also moves in the same direction.

During the movement of the block member 10 in the direction of arrow B, the meshing boss 10b moves in the opening 90 along the end plane of the stopper 63b, while the lock lever 63 is retained at the first lock position by the meshing boss 10b, and accordingly the rotation of the lock lever 63 and the movement of the mode selection lever 65 are precluded. When the meshing boss 10b reaches the end of the opening 90, the block member 10 cannot move any more, and at the same time the lock lever 63 cannot rotate freely due to the meshing boss 10b located at the stopper 63b.

Figure 15B:
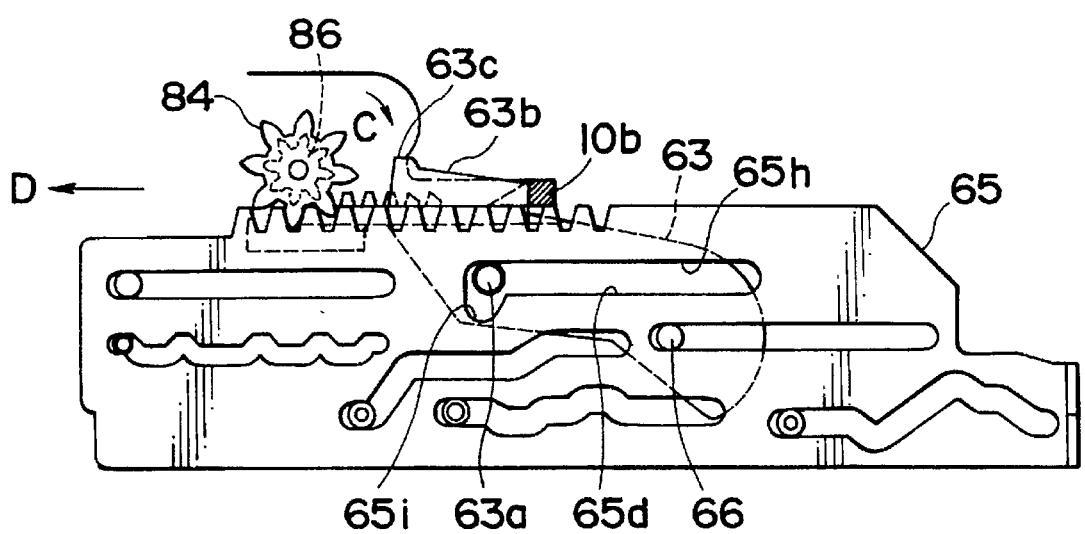

In this state, if the auxiliary motor 3 rotates continuously in one direction, the planetary gears 85 begin to spin since the carrier 83 which meshes with the first rack 10a cannot rotate any more, and the rotation of the sun gear 82 is transmitted from the ring gear 84 to the second rack 65a of the mode selection lever 65. As a result, the ring gear 8 starts rotating in the direction indicated by the arrow C as shown in FIG. 15B, causing a force to act on the mode selection lever 65 in the direction indicated by the arrow D, and the pin 63 of the lock lever 63 moves from the step 65i to the flat section 65h in the cam hole 65d and the lock lever 63 goes around the pin 66 in the clockwise (cw) direction to the second lock position. Consequently, the mode selection lever 65 starts moving in the direction indicated by the arrow D and, at the same time, the side end plane of the stopper 63b extends into the opening 90 to mesh with the meshing boss 10b, and the movement of the block member 10 is precluded by the lock lever 63.

In this manner, during the movement of the mode selection lever 65 in the direction indicated by the arrow D, the pin 63a of the lock lever 63 moves on the flat section 65h of the cam hole 65d, with the lock lever 63 being retained at the second lock position by the cam hole 65d during this movement, and the rotation of the lock lever 63 and the movement of the block member 10 are precluded. When the auxiliary motor 3 rotates in the opposite direction, the lock lever 63 is switched from the second lock position to the first lock position, and the foregoing operations take place in reverse.

As described above, the pin 63a and stopper 63b of the lock lever 63, the cam hole 65d of the mode selection lever 65 and the meshing boss 10b of the block member 10 that is part of the cassette carrying mechanism 4 in combination constitute a lock mechanism which selectively precludes the movement of the cassette carrying mechanism 4 or the mode selection lever 65.

Next, operation of this cassette tape player is explained.

Figure 3:
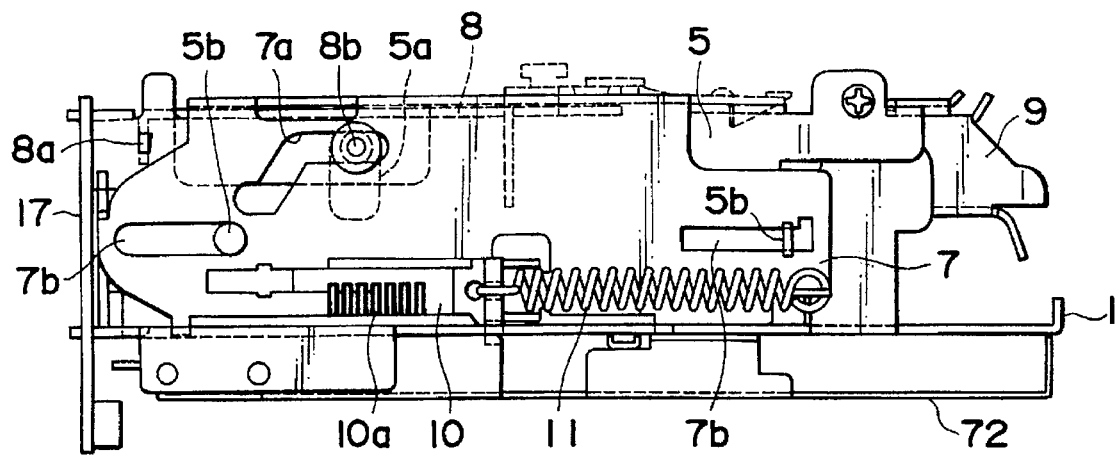
FIG. 3 is a side view of the cassette carrying mechanism of the cassette tape player, in the state of the end of cassette tape ejection.
Figure 4:
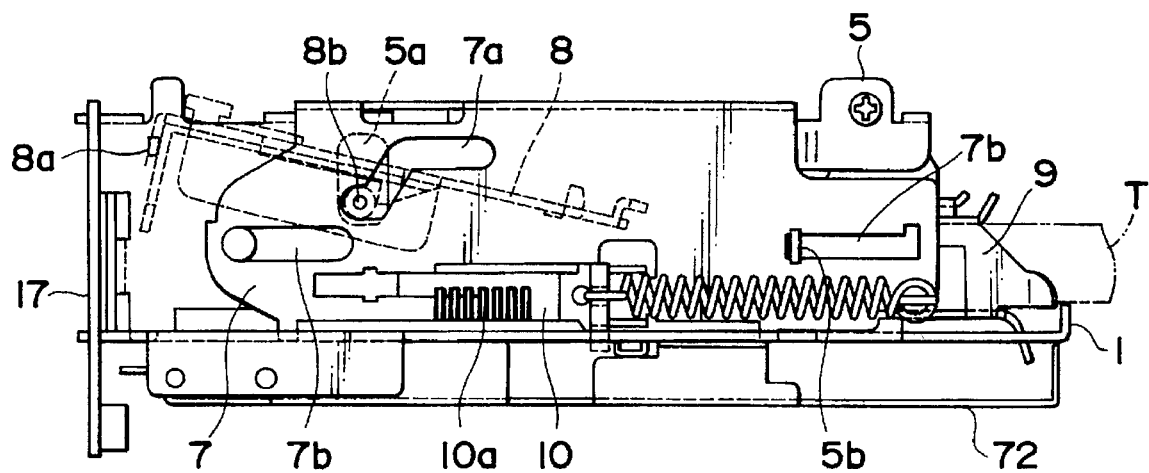
FIG. 4 is a side view of the cassette carrying mechanism in the state of the end of cassette tape loading.

Initially, a cassette tape T is inserted in the cassette holder 9 of the cassette tape player which is in the state of the end of tape ejection shown in FIGS. 1 and 3. The slider 19 is pushed in by being hooked by the reel holes of the cassette tape T, and the first ejection lever 13 turns in the counter-clockwise (ccw) direction in FIG. 1 against the pulling force of the extension spring 15. The boss on the detecting lever 16 moves in the cam hole 13a, causing the lever 16 to turn in the clockwise (cw) direction, and the cassette insertion detecting switch 18 turns on.

Following the turn-on of the cassette insertion detecting switch 18, the auxiliary motor 3 starts rotating in one direction (herein called the forward direction as opposed to the reverse direction), and the cassette carrying mechanism 4 implements the auto-loading operation. At this time, the lock lever 63 in its first lock position shown in FIG. 15A precludes the movement of the mode selection lever 65, and the forward rotation of the auxiliary motor 3 is transmitted by the sun gear 82 of the planetary gear mechanism 73 and the carrier 83 to the first rack 10a which meshes with the gear 86 of the carrier 83.

Figure 2:
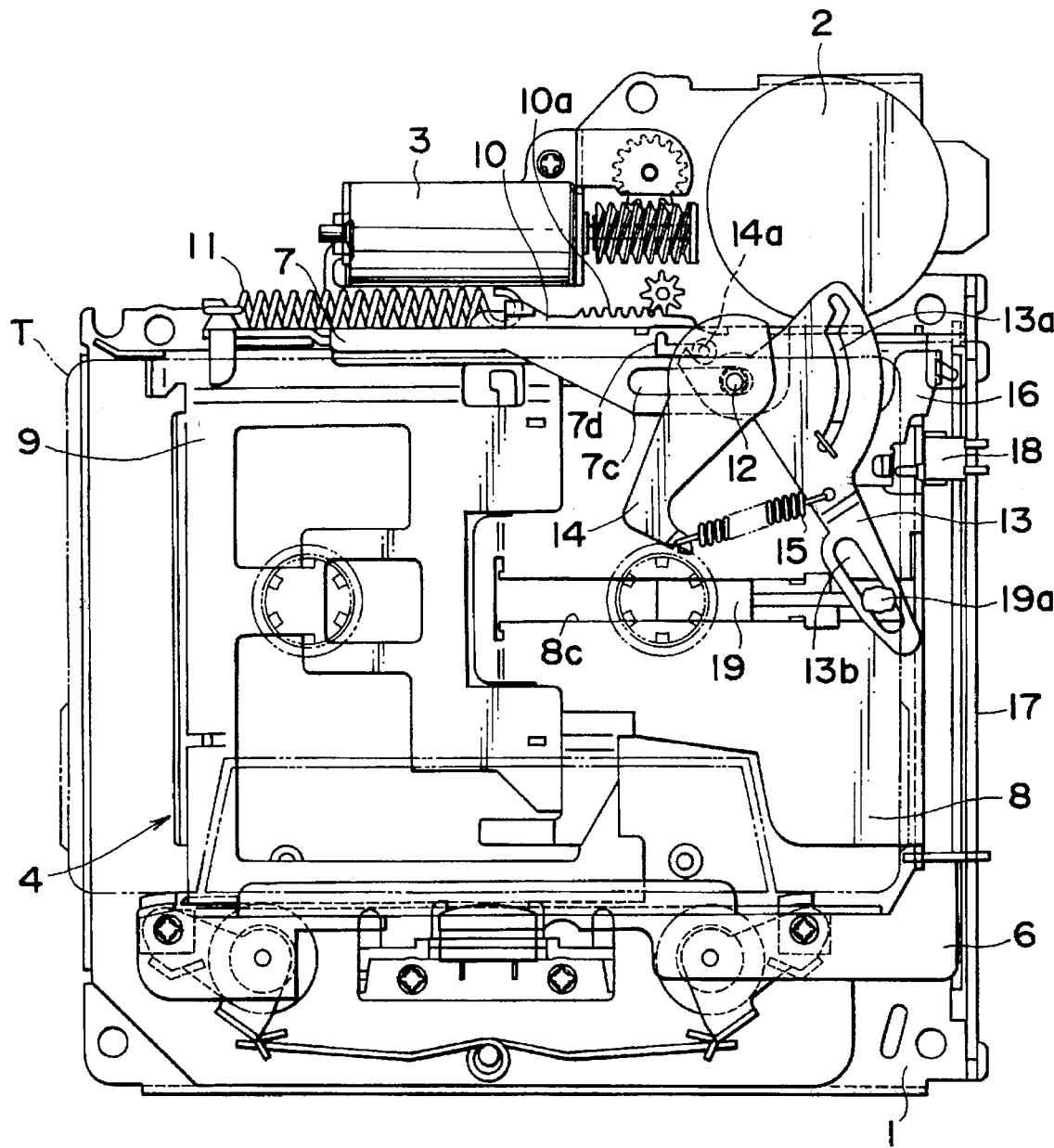
FIG. 2 is a plan view of the cassette tape player in the state of the end of cassette tape loading.

The movement of the first rack 10a moves the block member 10 and slide plate 7 to the left in FIG. 1 (or to the right in FIG. 3). The pin 14a of the second ejection arm 14 moves in the cam hole 7d, causing both ejection arms 13 and 14 to turn in the ccw direction around the pin 12, and the slider 19 slides deep into the plate base 8 along the guide groove 8c and the cassette tape T is pulled up to the end of the cassette holder 9 as shown in FIG. 2.

The movement of the slide plate 7 causes the roller 8b to move from the upper position to the lower position in the cam hole 7a. Consequently, the plate base 8 turns downward around the shaft 8a, causing the cassette holder 9 to fall to the lower position and loading of the cassette tape T completes.

On completion of loading of the cassette tape T, the meshing boss 10b of the block member 10 comes in contact with the end of the opening 90 of the chassis 1, causing the slide plate 7 to stop. At this moment, the output shaft of the planetary gear mechanism 73 is switched from the carrier 83 to the ring gear 84, and the rotation of the auxiliary motor 3 is transmitted from the ring gear 84 to the second rack 65a of the mode selection lever 65. Namely, at the end of loading of the cassette tape T, the lock lever 63 is switched from the first lock position shown in FIG. 15A to the second lock position shown in FIG. 15B, the mode selection lever 65 is moved to the pause position shown in FIG. 16 by the forward rotation of the auxiliary motor 3, and thereafter it is moved to one of positions of the operational modes shown in FIGS. 17 through 22 by the forward and reverse rotations of the auxiliary motor 3.

Figure 16:
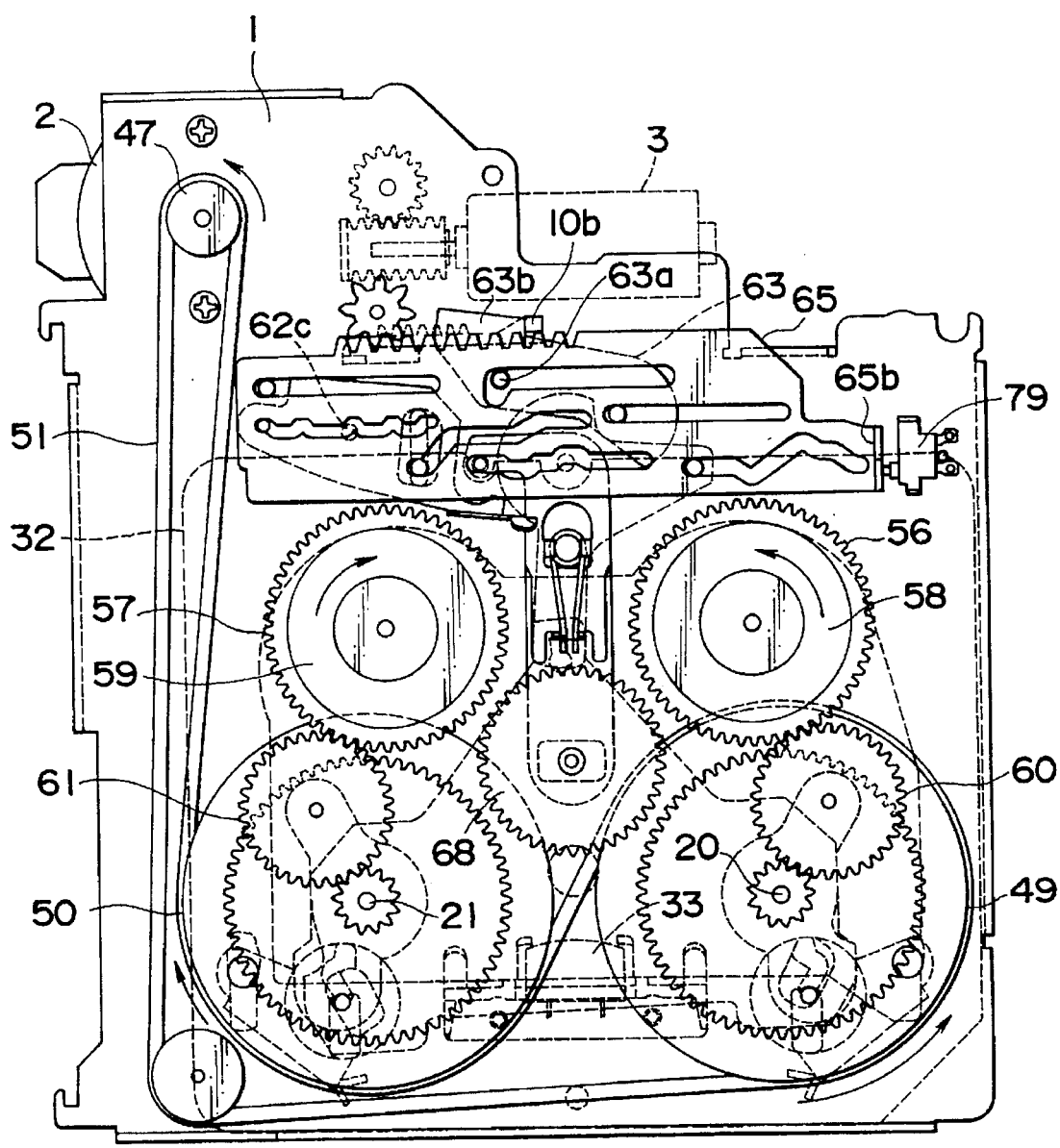
FIG. 16 is a bottom view of the cassette tape player in its Pause mode.

FIG. 16 shows the pause position of the mode selection lever 65 after it has moved slightly to the left from the cassette tape loading position. At this position, both idler gears 60 and 61 mesh with the reel gears 56 and 57, and the magnetic head 33 is located at the fully retracted position from the tape of the cassette tape T. After the mode selection lever 65 has come to the pause position, its pushing lug 65b goes off the reference position detecting switch 79 on the printed circuit board 75, causing the switch 79 to turn on. Then the auxiliary motor 3 stops based on the reference position signal released by the switch 79, and the main motor 2 starts rotating to carry out the tape slack eliminating operation.

Figure 23:
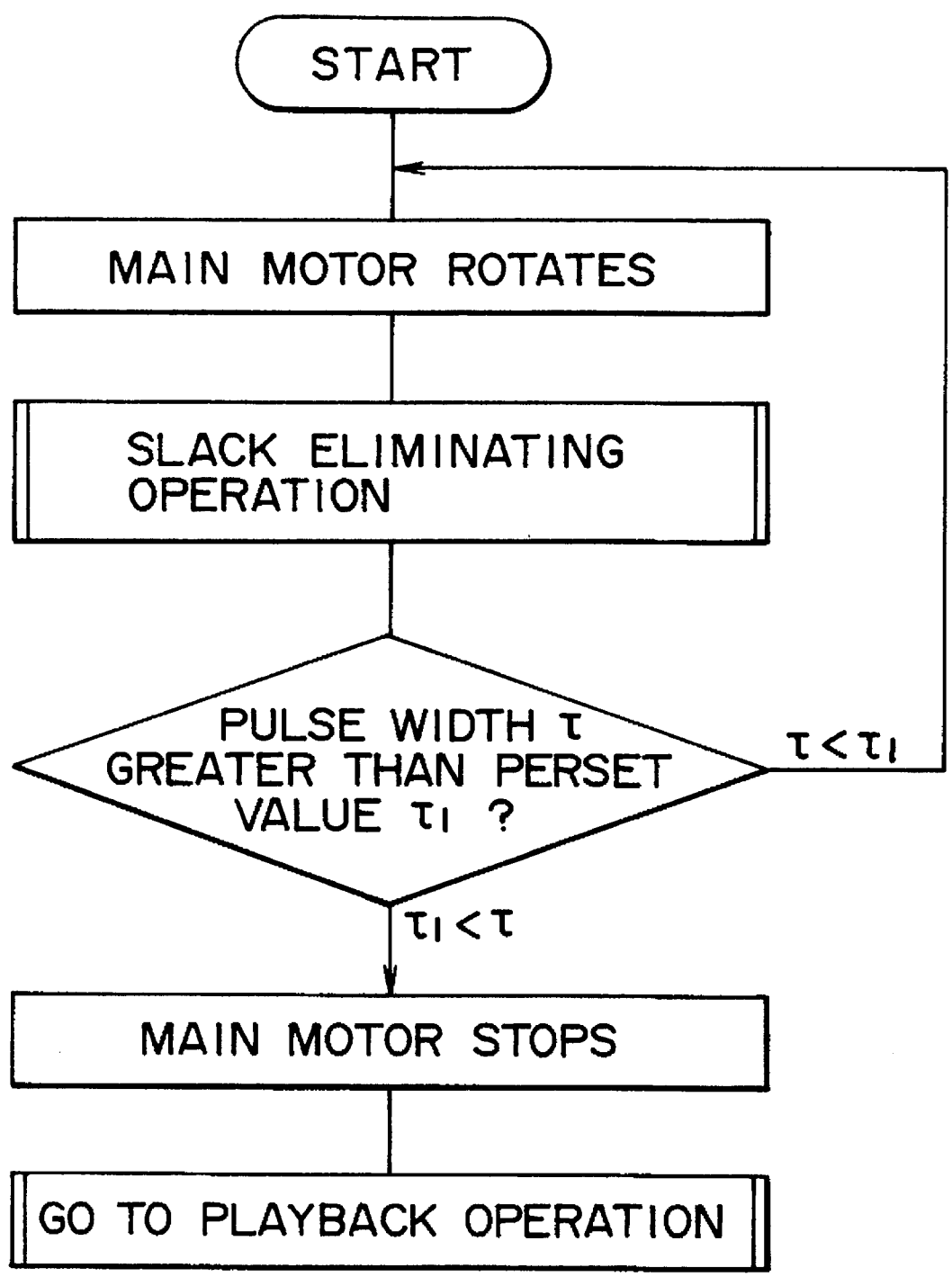
FIG. 23 is a flowchart showing the slack eliminating operation of the cassette tape player.

FIG. 23 is a flowchart showing the control sequence of the slack eliminating operation as carried out by a suitable controller. Initially, the main motor 2 starts rotating at the pause position. The rotation is transmitted by the belt 51 to both flywheels 49 and 50, and further transmitted by the idler gears 60 and 61 to both reel gears 56 and 57.

Consequently, both reel bases 36 and 37 rotate at a low speed in their own tape winding directions, causing both reels in engagement with the coupling members 54 and 55 of the reel bases 36 and 37 to rotate in their own tape winding directions, and the tape slack between the reels is eliminated. During rotation of the reel bases 36 and 37, the optical sensors 76 and 77, which are responsive to the reflective and non-reflective portions of the rotation detecting discs 58 and 59, output rectangular pulse signals having different duty-cycles.

Figure 27:
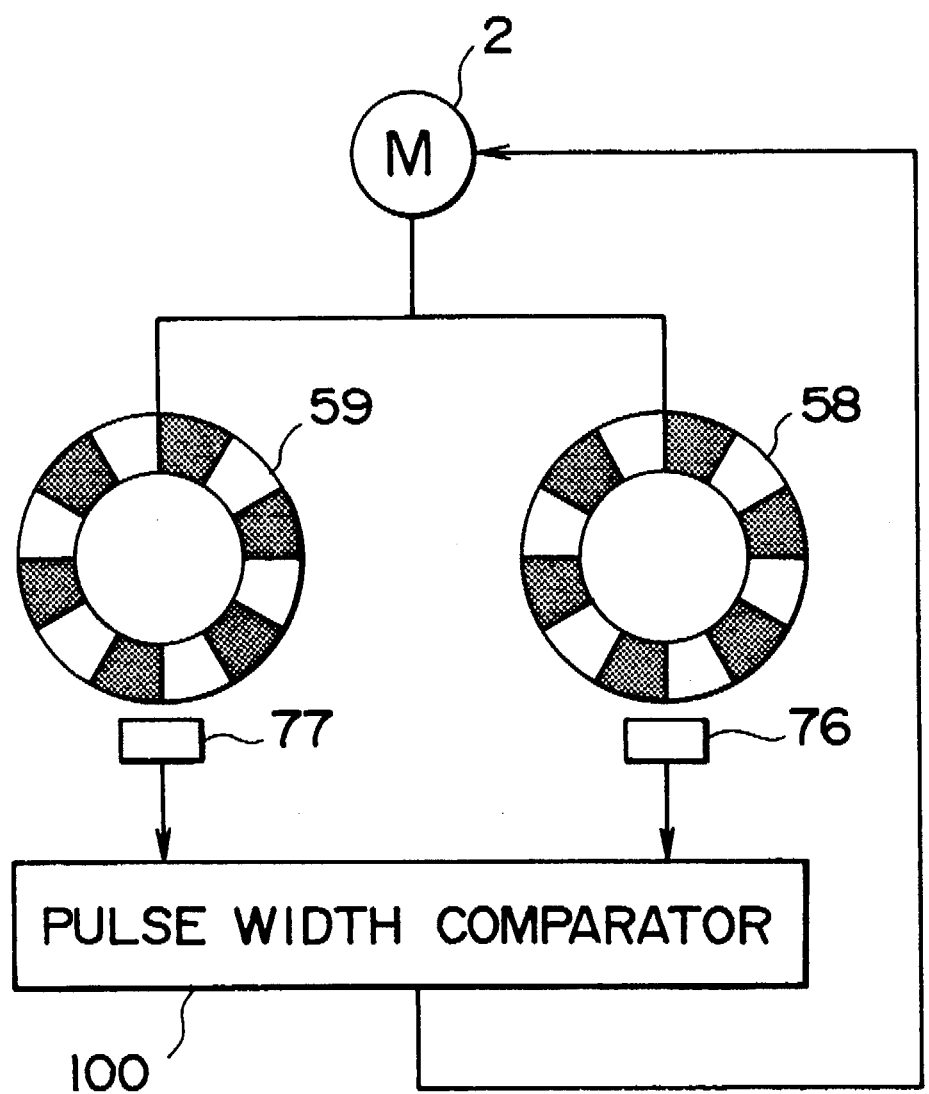
FIG. 27 is a view of the reel base rotation detecting device of the cassette tape player.

As shown in FIG. 27, the pulse signals output by the optical sensors 76 and 77 are coupled to a pulse width comparator 100, by which the pulse widths ($\tau$) of the pulse signals are compared to a preset value $\tau 1$ stored in the comparator 100. The value of $\tau 1$ is determined relative to the reference pulse width $\tau$ that would be output by the optical sensors 76 and 77 when the reel bases 36 and 37 rotate in a no-load condition. Specifically for the reference pulse width $\tau$ of about 47 ms, the preset value $\tau 1$ is 75 ms.

Figure 24A:
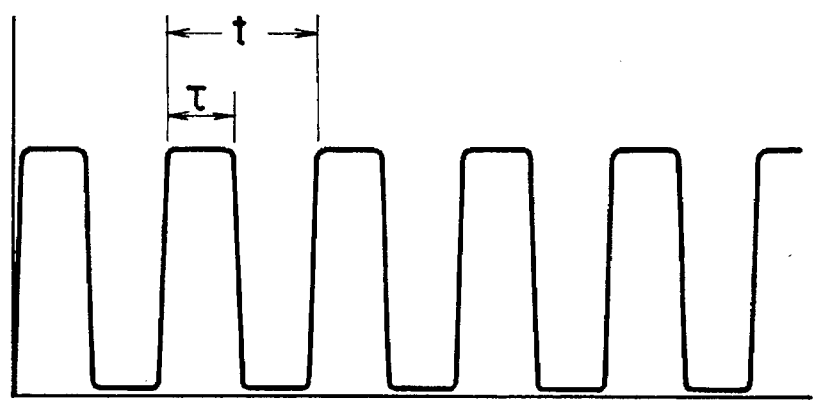
FIGS. 24A and 24B are waveform diagrams of the pulse signals produced by the optical sensors during the slack eliminating operation.
Figure 24B:
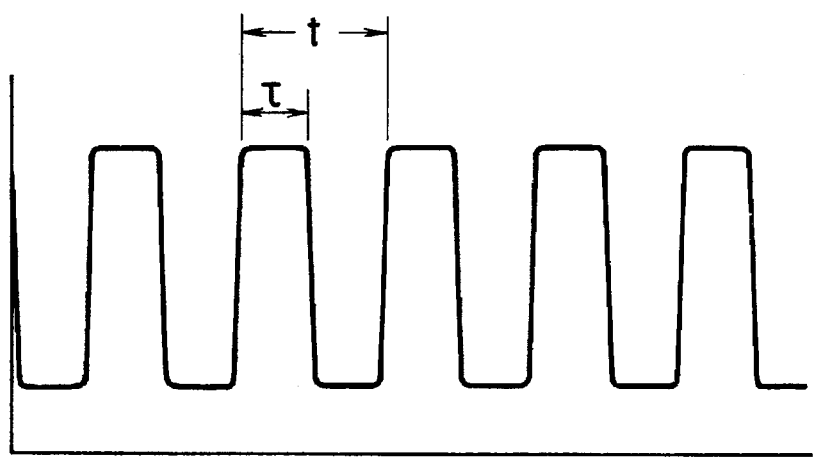

During the slack elimination, the reel bases 36 and 37, having no tape tension, rotate in virtually the no-load condition, and the rotation detecting discs 58 and 59 rotate without slipping relative to the reel gears 56 and 57. Accordingly, both optical sensors 76 and 77 output pulse signals of virtually the same pulse width $\tau$ as shown in FIGS. 2A and 24B. The pulse width $\tau$, which is virtually equal to the pulse width $\tau$ of the no-load condition, is smaller than $\tau 1$, and in this case the slack eliminating operation continues.

When the slack has been removed, the tape between the reels creates a tension, causing the rotation detecting discs 58 and 59 on the transmission member 91 to slip against the reel gears 56 and 57, and the pulse width $\tau$ of the sensor output signals varies relative to the no-load condition.

In the case of the slack eliminating operation at the middle of the wound tape, in which case both reels have virtually the same amount of tape at the end of slack elimination, the reel bases 36 and 37 coupled to the reels have no difference of winding torque, and therefore the rotation detecting discs 58 and 59 stop rotating by slipping against the reel gears 56 and 57. Consequently, the pulse widths T of the pulse signals from the optical sensors 76 and 77 becomes infinity, i.e., $\tau < \tau 1$. In response to this transition indicative of the elimination of slack, the pulse width comparator 100 outputs a signal for stopping the main motor 2.

In the case of the slack eliminating operation at a tape position close to one end of the tape, the reel bases 36 and 37 coupled to the reels have a significant difference in their winding torques depending on the amounts of wound tape at the end of slack elimination. Consequently, the rotation detecting disc 58 (or 59) of the reel base 36 (or 37) with the larger winding torque for the reel with the smaller amount of wound tape rotates continuously, whereas the rotation detecting disc 59 (or 58) of the reel base 37 (or 36) with the smaller winding torque for the reel with the larger amount of wound tape is rotated reversely in the tape pay-out direction by slipping.

As a result, the pulse widths of the pulse signals from the optical sensors 76 ands 77 varies as shown in FIGS. 25A and 25B, with the pulse width $\tau$ of a reel with the larger amount of wound tape exceeding the preset value $\tau 1$ indicative of the elimination of slack, and the pulse width comparator 100 produces a signal for stopping the main motor 2.

FIG. 25A is the waveform of the pulse signal of the reel with the smaller amount of wound tape, and FIG. 25B is the waveform of the pulse signal of the reel with the larger amount of wound tape. The pulse width comparator 100 is e.g. a microcontroller (not shown).

Judgement of the end of slack elimination is made at the time when the pulse width $\tau$ of any of the optical sensors 76 and 77 exceeds the preset value $\tau 1$ independently of the tape position of the cassette tape T in the hold position, and the main motor 2 is stopped based on this judgement. Accordingly, the slack of tape before the cassette tape T is loaded is eliminated automatically immediately after the cassette tape T is placed in the hold position.

Figure 17:
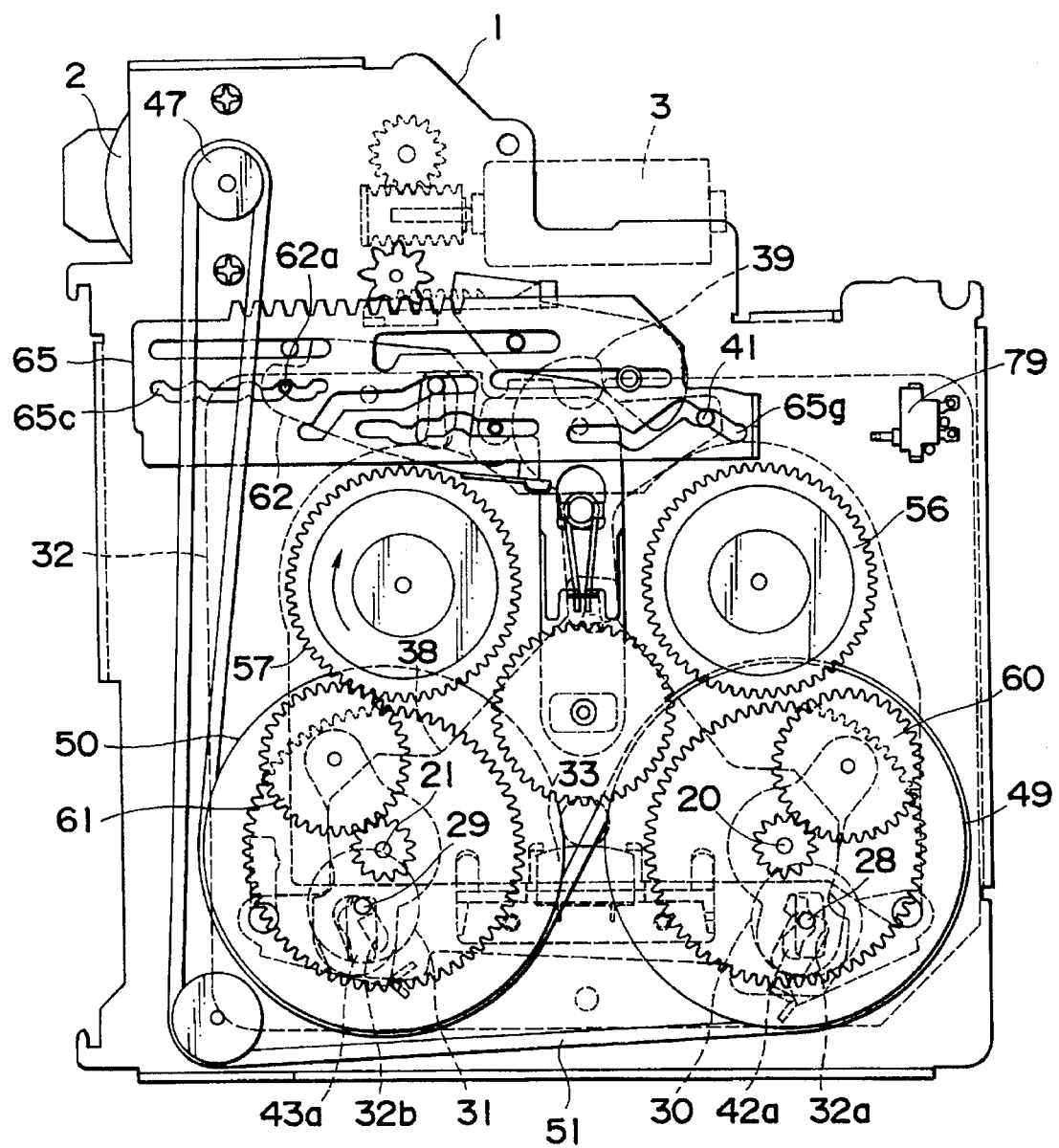
FIG. 17 is a bottom view of the cassette tape player in its Normal Play mode.

Since the period of the pulse signals from the optical sensors 76 and 77 varies depending on the rotational speed of the rotation detecting discs 58 and 59, judgement of the end of slack elimination may be made at a time point when the period $\tau$ of the pulse signal of any of the optical sensors 76 and 77 exceeds the preset value $\tau 1$ which is determined from the reference period $\tau 0$ which is twice the pulse width $\tau 1$ On completion of the foregoing slack eliminating operation, the auxiliary motor 3 rotates in the forward direction again, and the mode selection lever 65 is moved from the pause position to the normal play position shown in FIG. 17. At the same time, the position detecting lever 62 moves by the relative motion of the pin 62a and the cam hole 65c, causing the mode detecting switch 80 to operate on and off cyclically depending on the amount of movement of the mode selection lever 65. After the reference position detecting switch 79 turns on, the microcontroller counts the on/off operations of the mode detecting switch 80 so that the mode selection lever 65 moves accurately to a certain operational mode position, i.e., normal play position in this case. At the normal play position, the head base 32 advances due to the relative motion of the pin 32c and the cam hole 65e, causing the magnetic head 33 to move to the advanced position where it comes in contact with the tape, and, at the same time, the long holes 32a and 32b of the head base 32 also move to the advanced position.

The selection arm 39 turns due to the relative motion of the pin 41 and the cam hole 65g, causing the selection lever 38 which couples with the selection arm 39 to turn in the cw direction in FIG. 17 around the boss 1a. Consequently, the pivot 29 located on the left in the figure comes in contact with the upper end of the cam hole 43a and the pivot 28 located on the right in the figure is moved back by the cam hole 38c of the selection lever 38 to come in contact with the bent section of the cam hole 42a, causing one idler gear 61 to mesh with the reel gear 57 and another idler gear 60 to separate from the reel gear 56.

After the mode selection lever 65 has reached the normal play position, the auxiliary motor 3 stops and the main motor 2 starts rotating. The rotation is transmitted by the belt 51 to both flywheels 49 and 50. Since the idler gear 60 is disengaged from the reel gear 56, the rotation is transmitted by the idler gear 61 only to the reel gear 57, and it rotates at the low speed in the tape winding direction.

The left-hand pinch roller 31 in the figure is pressed onto the capstan shaft 21 through the tape, and the tape is rewound from the supply reel, subjected to the reproduction of recorded information by the magnetic head 33 which is in contact with the tape, and wound on the take-up reel.

The tape runs in the normal direction and when the tape end position comes, the coupling member 55 slips against the reel gear 57, causing both reel bases 36 and 37 to stop rotating, and the auto-reverse operation will take place. Specifically, the main motor 2 first stops and the auxiliary motor 3 rotates in the forward direction again causing the mode selection lever 65 to move from the normal play position to the reverse play position shown in FIG. 18. Consequently, the selection arm 39 turns due to the relative motion of the pin and the cam hole 65g and the selection lever 38 turns in the ccw direction in FIG. 18 around the boss 1 a, causing the pivot 29 on the left in the figure to be moved back by the cam hole 38d of the selection lever 38 and the right-hand pivot 28 to advance to the position where it comes in contact with the upper edge of the cam hole 42.

Accordingly, one idler gear 61 separates from the reel gear 57 and another idler gear 60 meshes with the reel gear 56, as opposed to the normal play operation.

After the mode selection lever 65 has reached the reverse play position, the auxiliary motor 3 stops and the main motor 2 starts rotating again. The rotation is transmitted by the belt 51 to both flywheels 49 and 50. Since the idler gear 61 is disengaged from the reel gear 57, the rotation is transmitted by the idler gear 60 only to the reel gear 56, and it rotates at the low speed in the tape winding direction. The pinch roller 30 is pressed onto the capstan shaft 20 through the tape, and the tape is rewound from the supply reel, fed in the reverse direction, and wound on the take-up reel.

During the foregoing normal play operation or reverse play operation, if the REW (rewind) mode is selected, the main motor 2 stops and the auxiliary motor 3 rotates in the reverse direction, causing the mode selection lever 65 to move from the normal play position or reverse play position to the REW position. For example, when the mode selection lever 65 is moved from the normal play position to the REW position shown in FIG. 19, the selection swing 64 turns around the pivot 67 due to the relative motion of the pin 64a and the cam hole 65f, causing the swing gear 68 pivoted by the selection swing 64 to mesh with the reel gear 56 and the large gear 49b of the flywheel 49.

The head base 32 retreats slightly due to the relative motion of the pin 32c and the cam hole 65e, causing the magnetic head 33 to come in light contact with the tape. The pivot 29 located on the left in the figure is moved back by the cam hole 38d of the selection lever 38, the right-hand pivot 28 is retained at the retreat position by the long hole 32a of the head base 32, and the idler gears 60 and 61 disengage from the reel gears 56 and 57.

When the mode selection lever 65 reaches the REW position, the auxiliary motor 3 stops and the main motor 2 starts rotating again. The rotation is transmitted by the belt 51 to both flywheels 49 and 50. Since the idler gears 60 and 61 are in disengagement from the reel gears 56 and 57 and the swing gear 68 is engaged with the reel gear 56 and the large gear 49b of the flywheel 49, the reel gear 56 rotates in its tape winding direction and the tape is rewound at the high speed.

Figure 26:
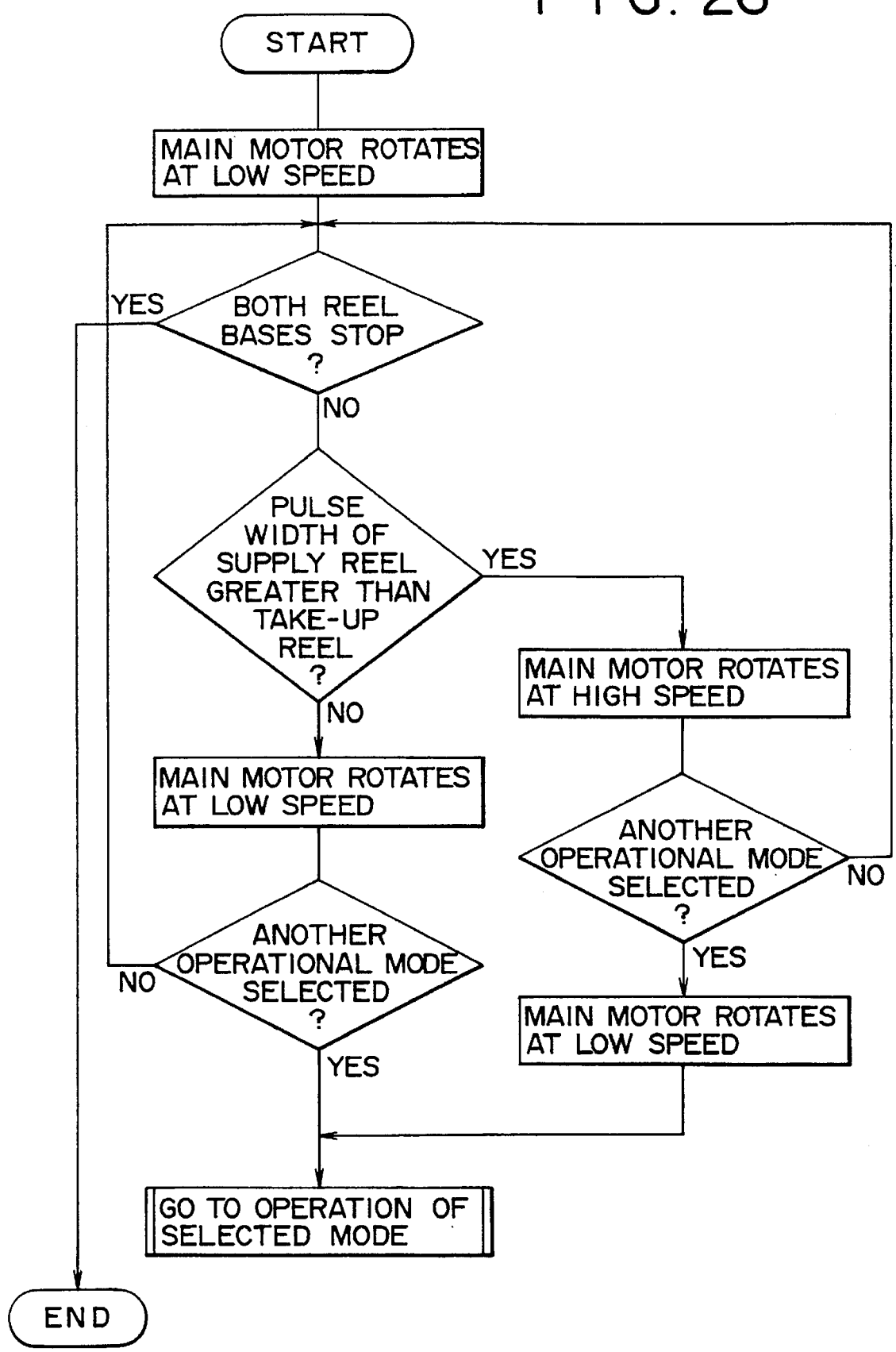
FIG. 26 is a flowchart showing the FF and REW operations of the cassette tape player.

FIG. 26 is a flowchart showing the control sequence of the foregoing REW operation (and FF operation which will be explained later). Initially, the main motor 2 rotates at the low speed, causing the take-up reel base 36 to rotate at the usual high speed and the supply reel base 37 also rotates in the same direction.

Following the commencement of the REW operation, the rotation of the reel bases 36 and 37 is examined based on the pulse signals from the optical sensors 76 and 77 thereby to judge as to whether the tape is at the rewind-end position. In the case of the judgement of tape end, the REW operation is terminated, or otherwise the pulse widths of the pulse signals from the optical sensors 76 and 77 are compared.

The pulse widths of the optical sensors 76 and 77 vary depending on the rotational states of the reel bases 36 and 37, as mentioned previously. Specifically, if the REW operation begins when a smaller amount of tape is wound on the take-up reel than the supply reel, the pulse width $\tau$ of the optical sensor 76 for the take-up reel base 36 is smaller than that of the optical sensor 77 for the supply reel 37. In this case, the rotation of the main motor 2 is switched to the higher speed, and the take-up reel base 36 rotates at an extra high speed that is higher than the usual high speed. During the REW operation at the extra high speed, if there arises a key input to select other operational mode, e.g., Normal Play mode, the rotation of the main motor 2 is switched back to the lower speed and the take-up reel base 36 is slowed down to the usual high speed for a certain duration (one second in this embodiment), and thereafter the operation proceeds to the newly selected Normal Play mode.

If, on the other hand, there is no key input for selecting other mode during the extra high speed REW operation, the main motor 2 rotates continuously at that speed until the pulse signals of both optical sensors 76 and 77 have the same pulse width $\tau$.

In this embodiment, as shown in FIG. 26, as to whether the reel bases 36 and 37 stop is detected uninterruptedly even during the extra high speed REW operation, and the REW operation is terminated if both reel bases 36 and 37 stop. The reason for this scheme is that during the extra high speed REW operation, the tape which is being rewound on the take-up reel can possibly shift progressively in the axial direction and a resulting frictional force of the tape against the interior surface of the cassette can cause the reel bases 36 and 37 to stop, and unless the stoppage of both reel bases 36 and 37 is detected, the player cannot get out of the extra high speed REW mode and the cassette tape T which is in trouble cannot be removed from the player.

In case the REW operation starts, with both reels having virtually the same amount of wound tape, or when the amounts of wound tape on both reels become virtually equal during the extra high speed REW operation, the pulse widths of both optical sensors 76 and 77 become equal. In case the REW operation starts, with the take-up reel having a larger amount of tape than the supply reel, the pulse width of the optical sensor 76 becomes greater than that of the optical sensor 77. In these cases where the pulse width of the optical sensor 76 for the take-up reel is greater than or equal to that of the optical sensor 77 of the supply reel, the main motor 2 rotates continuously at the low speed and the reel base 36 for the take-up reel rotates at the usual high speed.

During this usual REW operation, if there arises a key input to select other operational mode, the operation proceeds to the selected mode, or otherwise the REW operation continues to rewind the whole tape and terminates when the end of tape is detected. For detecting the difference of rotation of the reel bases 36 and 37 more accurately, the time lengths of one rotation of the rotation detecting discs 58 and 59 may be compared, instead of comparing the pulse widths of the output pulse signals. On completion of the foregoing REW operation, the mode selection lever 65 is driven by the forward rotation of the auxiliary motor 3 to move to the normal play position shown in FIG. 17, and the normal operation is restored.

At this time, although the reel gear 57 for the supply reel tends to rotate continuously due to its inertia after the reel gear 56 for the take-up reel has stopped, it is such that the mode selection lever 65 moves to the normal play position by way of the REW brake position at which the reel gear 57 for the supply reel is braked, thereby to prevent the slack of tape from occurring. Specifically, when the mode selection lever 65 has moved slightly (e.g., 2 mm) to the left from the REW position shown in FIG. 19 and come to the REW brake position shown in FIG. 20, the swing gear 68 separates from the reel gear 56 and the large gear 49b of the flywheel 49 by the turning selection swing 64 and comes back to the center position and, at the same time, the selection lever 38 turns in the ccw direction in FIG. 19, causing the left-hand pivot 29 to be moved back by the cam hole 38d and one idler gear 61 to mesh with the reel gear 57. Consequently, at mode switching from the REW operation to the normal play operation, when the reel gear 56 for the take-up reel stops rotating due to the returning to center of the swing gear 68, the reel gear 57 for the supply reel also stops rotating simultaneously due to plunging of the idler gear 61, and the slack of tape does not occur.

Figure 20:
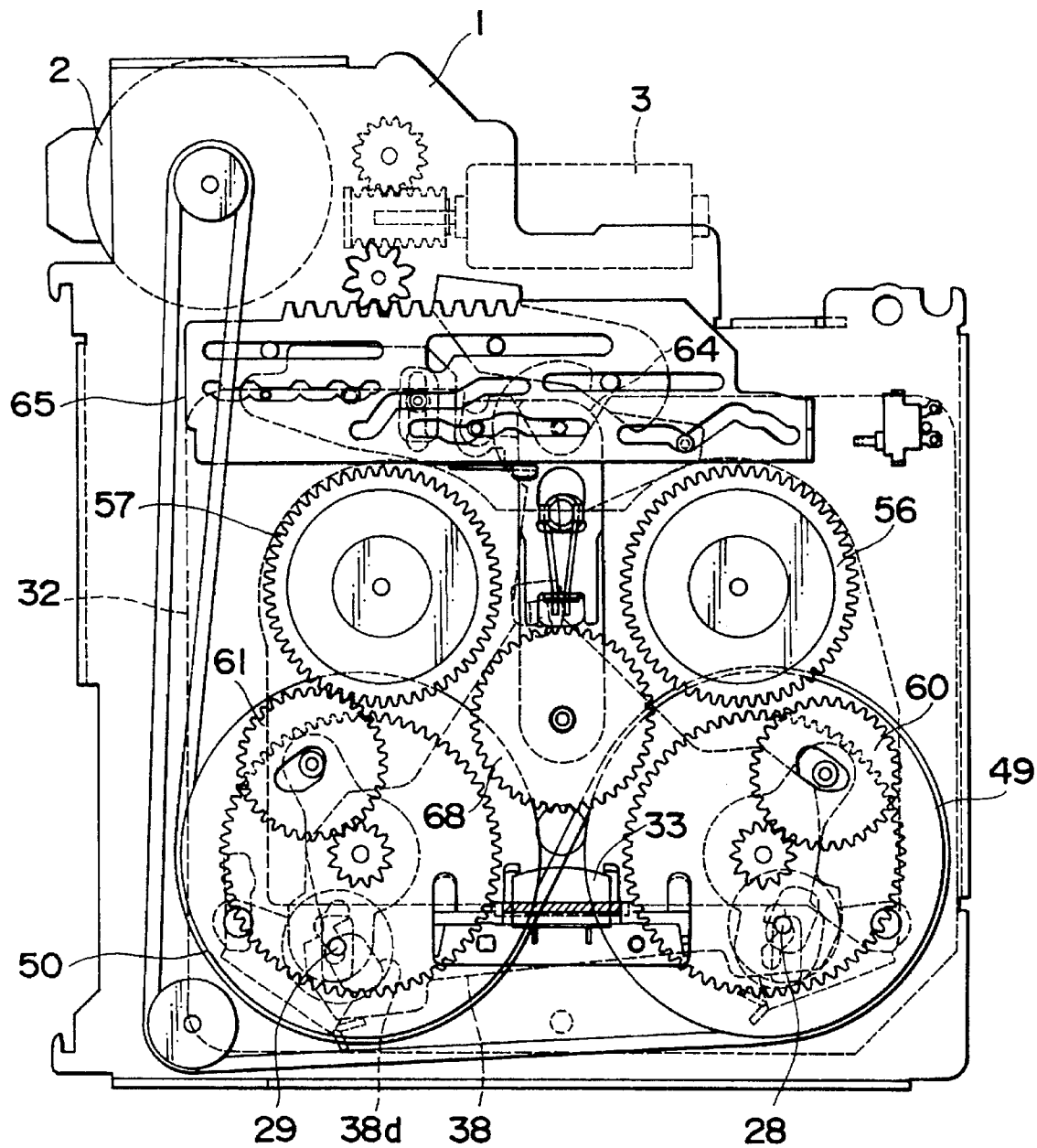
FIG. 20 is a bottom view of the cassette tape player in its REW brake operation.
Figure 21:
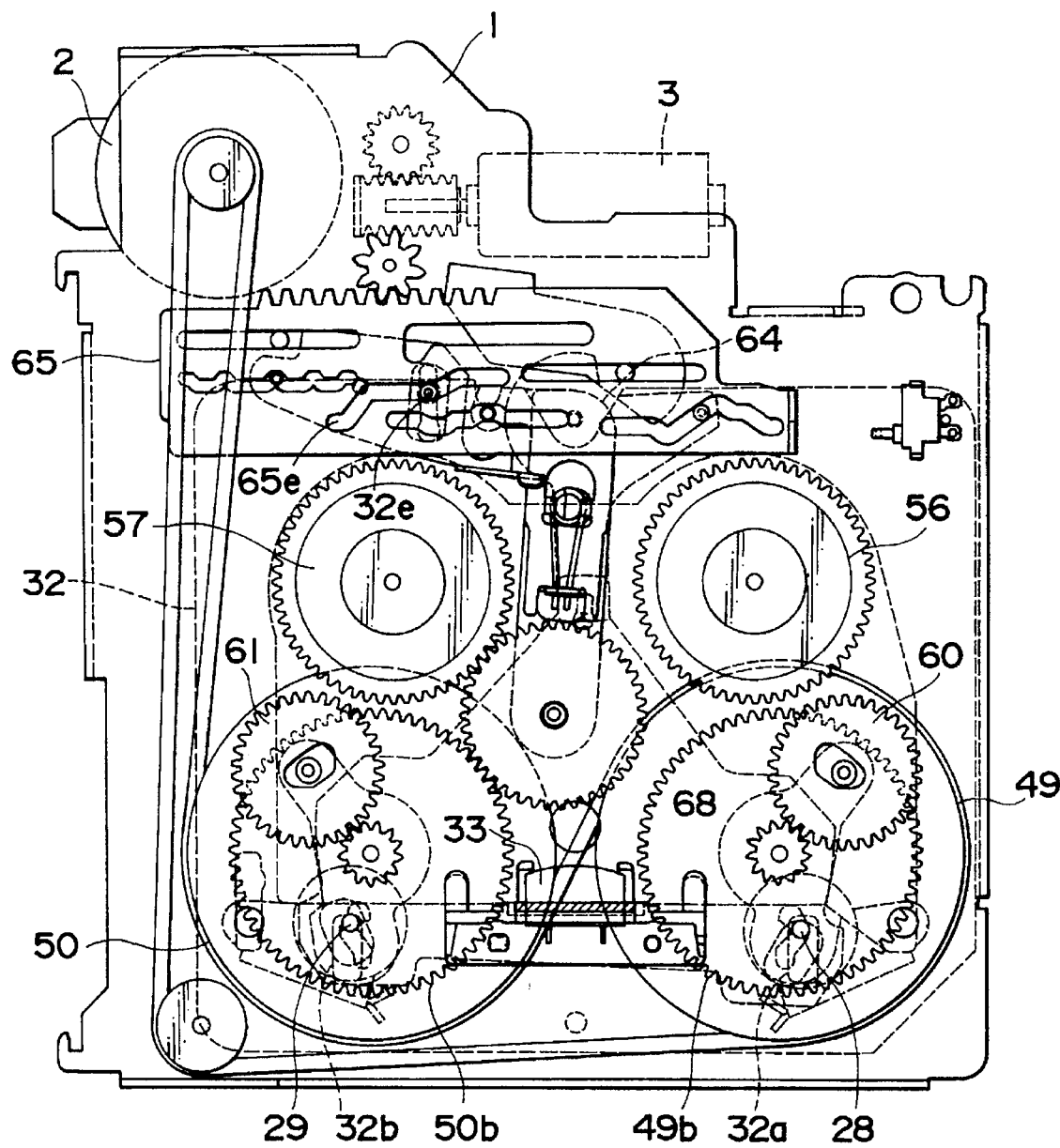
FIG. 21 is a bottom view of the cassette tape player in its Fast Feed (FF) mode.
Figure 22:
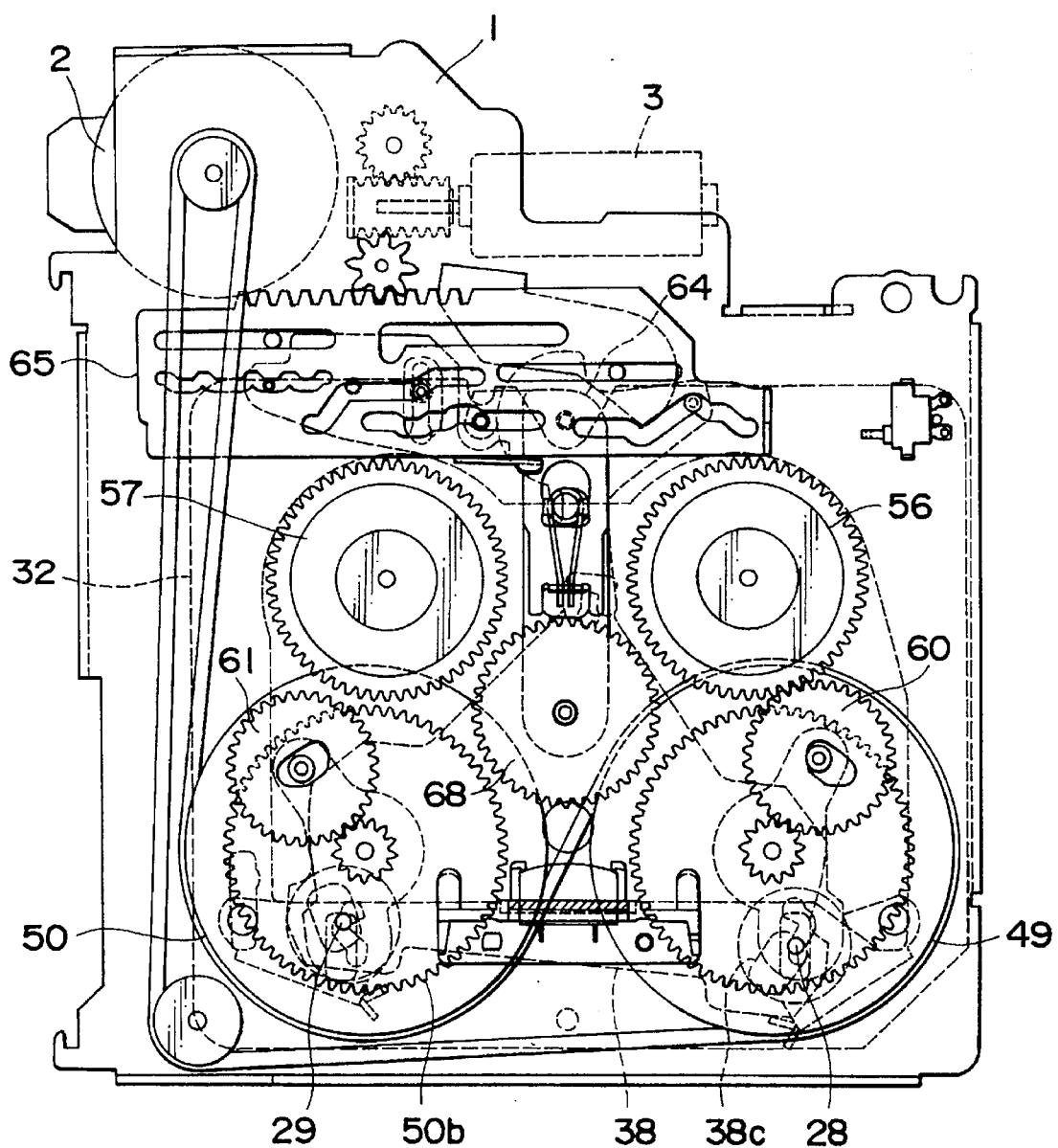
FIG. 22 is a bottom view of the cassette tape player in its FF brake operation.

The idler gear 61 rotates continuously in the ccw direction in FIG. 20 due to the inertia of the flywheel 50 after the main motor 2 has stopped. This rotational direction is opposite to the inertia force acting on the reel gear 57 for the supply reel, and therefore the reel gear 57 rotates slightly in the tape winding direction when the idler gear 61 has meshed with the reel gear 57, and the slack of tape can more surely be prevented.

In case the FF (fast feed) mode is selected during the normal play or reverse play operation, the main motor 2 stops and the auxiliary motor 3 rotates in the reverse direction, causing the mode selection lever 65 to move from the normal play position or reverse play position to the FF position. For example, when the mode selection lever 65 moves from the normal play position to the FF position shown in FIG. 21, the selection swing 64 turns around the pivot 67 of the selection swing 64 in the cw direction in the figure, causing the swing gear 68 pivoted by the selection swing 64 to mesh with the left-hand reel gear 57 and the large gear 50b of the flywheel 50. The head base 32 is moved back slightly by the relative motion of the pin 32c and cam hole 65e, causing the magnetic head 33 to come in light contact with the tape.

The pivots 28 and 29 are moved back by the cam hole 38c of the selection lever 38 and the long hole 32b of the head base 32, causing the idler gears 60 and 61 to disengage from the reel gears 56 and 57. After the mode selection lever 65 has reached the FF position, the auxiliary motor 3 stops and the main motor 2 rotates again. The rotation is transmitted by the belt 51 to both flywheels 49 and 50. Since the idler gears 60 and 61 are in disengagement from the reel gears 56 and 57 and the swing gear 68 is in engagement with the reel gear 57 and the large gear 50b of the flywheel 50, the reel gear 57 rotates in the tape winding direction and the tape is wound at the high speed in the same direction as the normal play operation.

The foregoing FF operation is carried out in accordance with the control sequence shown in the flowchart of FIG. 26. The operation is basically identical to the REW operation, and a detailed explanation is omitted. During the extra high speed FF operation, if there is a key input to select other operational mode, the rotation of the main motor 2 is switched from the higher speed to the lower speed, and the take-up reel base 37 is slowed down to the usual high speed for a certain duration, and thereafter the operation proceeds to the newly selected mode.

Figure 18:
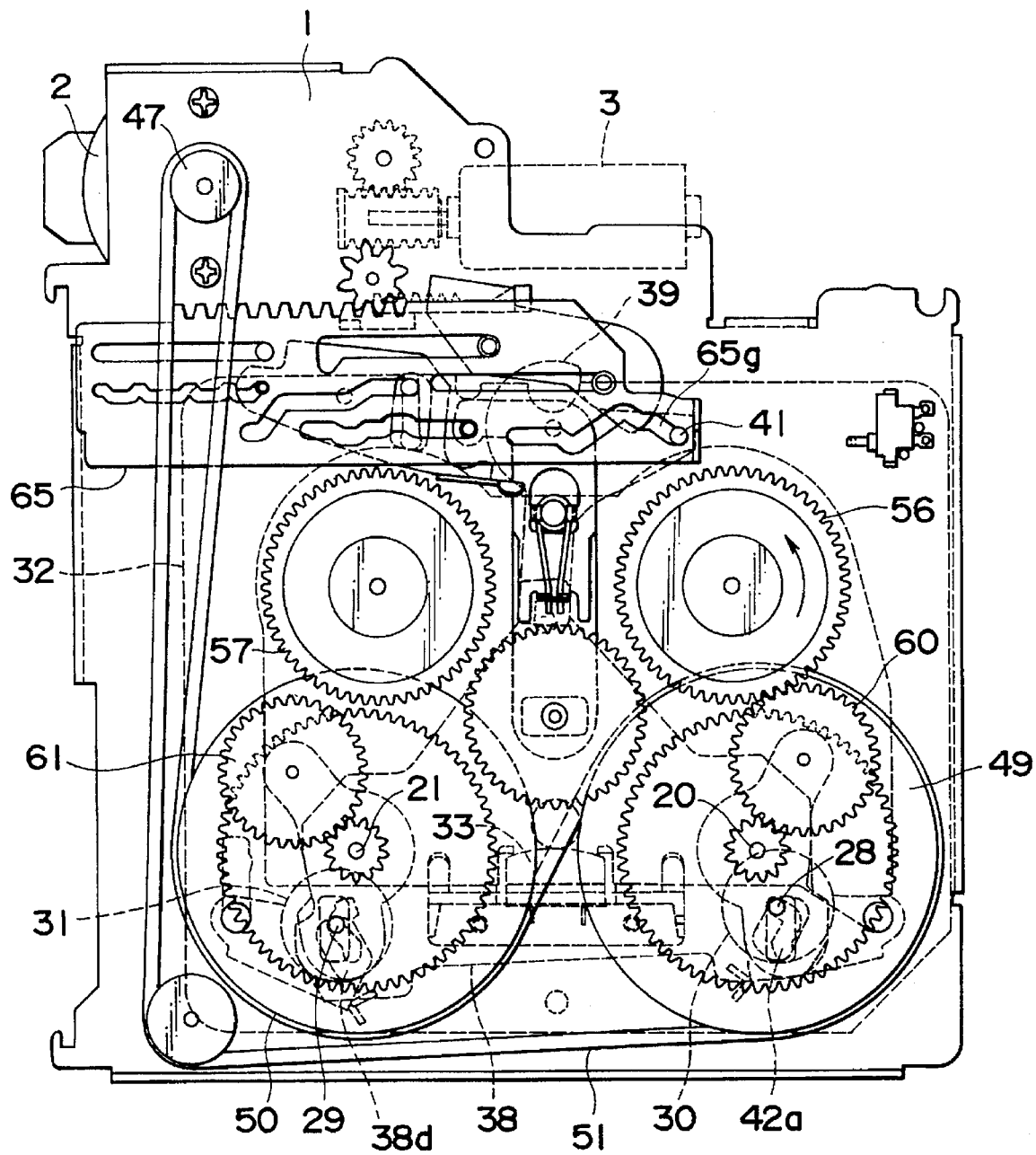
FIG. 18 is a bottom view of the cassette tape player in its Reverse Play mode.
Figure 19:
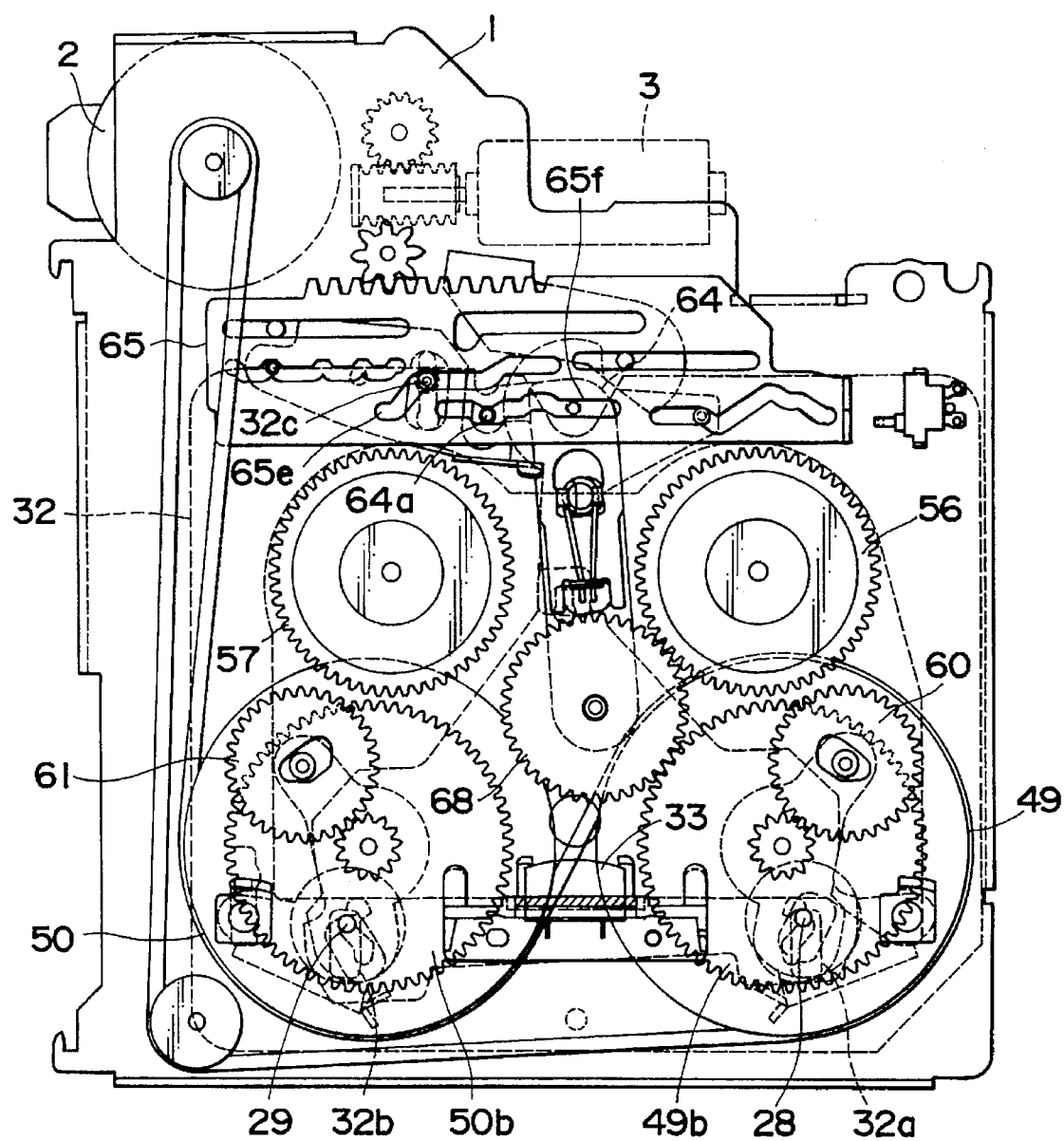
FIG. 19 is a bottom view of the cassette tape player in its Rewind (REW) mode.

On completion of the foregoing FF operation, the mode selection lever 65 is moved to the reverse play position shown in FIG. 18 by the forward rotation of the motor 3, and subsequently the reverse play operation takes place. In this case, the mode selection lever 65 is moved by way of the FF brake position to the reverse play position so that the reel gear 56 for the supply reel is braked at the FF brake position thereby to prevent slack in the tape, as in the case of mode switching from the REW operation to the normal play operation explained previously. Specifically, when the mode selection lever 65 has moved slightly (e.g., 2 mm) to the left from the FF position shown in FIG. 21 and come to the FF brake position shown in FIG. 22, the swing gear 68 separates from the reel gear 57 and the large gear 50b of the flywheel 50 by the turning selection swing 64 and comes back to the center position and, at the same time, the selection lever 38 turns in the cw direction in FIG. 20, causing the right-hand pivot 28 to be moved back by the cam hole 38c and one idler gear 60 to mesh with the reel gear 56. Consequently, at mode switching from the FF operation to the reverse play operation, when the reel gear 57 for the take-up reel stops rotating due to returning to center of the swing gear 68, the reel gear 56 for the supply reel also stops rotating simultaneously due to plunging of the idler gear 60, and the slack of tape does not occur.

Also in this case, the reel gear 56 rotates slightly in the tape winding direction when the idler gear 60 has meshed with the reel gear 56, and the slack of tape can more surely be prevented.

On completion of any of the foregoing operational modes, if the Tape Eject mode is selected, the auxiliary motor 3 rotates in the reverse direction, causing the mode selection lever 65 to move to the pause position shown in FIG. 16. At the pause position, the pushing lug 65b of the mode selection lever 65 comes in contact with the reference position detecting switch 79 on the printed circuit board 75, turning it off. Consequently, the auxiliary motor 3 stops and the main motor 2 rotates in turn, and the same slack eliminating operation as that at loading of the cassette tape T described previously takes place.

Based on this operation, the slack of tape of the cassette tape T in the hold position is eliminated automatically before it is taken out of the player, so that the cassette tape T without slack can be loaded next time. On completion of the slack eliminating operation, the auxiliary motor 3 rotates in the reverse direction gain, causing the mode selection lever 65 to move from the pause position to the initial position of the end of loading of the cassette tape T.

Thereafter, the auto-ejecting operation, which is the reversal of the auto-loading operation described previously, takes place. Specifically, with the cassette tape T being in the hold position, the planetary gear mechanism 73 has its output shaft switched from the ring gear 84 to the carrier 83. The lock lever 63 moves from the second lock position shown in FIG. 15B to the first lock position shown in FIG. 15A, and the block member 10 is moved by the reverse rotation of the auxiliary motor 3.

Consequently, the slide plate 7 moves in the direction opposite to the auto-loading operation to turn the plate base 8 upward, both ejection arms 13 and 14 turn to slide the slider 19 toward the front of the plate base 8, and the cassette tape T is pushed out of the cassette holder 9. The detecting lever 16 turns in the ccw direction in FIG. 1, causing the cassette insertion detecting switch 18 to turn off, and the auxiliary motor 3 is stopped to complete the cassette tape ejecting operation.

Besides the foregoing operations, the cassette tape player is switched from the Normal Play, Reverse Play, FF or REW mode to the Pause mode in response to the Pause key pressed by the user. Also in this case, the mode selection lever 65 moves to the pause position and the slack eliminating operation takes place as described above.

During the operation in any mode, if the power is turned off or if the count error of the mode detecting switch 80 occurs, the mode selection lever 65 will return to the cassette tape hold position to turn off the reference position detecting switch 79 when the power is turned on or the microcontroller is reset. With the mode selection lever 65 being moved to the pause position, when the reference position detecting switch 79 is turned on, an operational mode is selected again based on the reference position signal released by the switch 79. Accordingly, an awkward procedure for the repetitive mode selection at the time point when the cassette insertion detecting switch 18 turns on following the temporary ejection of the cassette tape T can be avoided, and the control sequence is simplified.

Although in the foregoing embodiment, the mode selection lever 65 is moved by the output torque of the ring gear 84 of the planetary gear mechanism 73 and the cassette carrying mechanism is driven by the output torque of the carrier 83, the system may be altered such that the ring gear 84 drives the cassette carrying mechanism and the carrier 83 moves the mode selection lever 65.

According to this invention, as described above, during the cassette tape loading or ejecting operation, the lock mechanism at the first lock position causes the torque of the drive motor to be transmitted only to the rack of cassette carrying mechanism by way of one output gear of the planetary gear mechanism, and the lock mechanism, which is switched to the second lock position by the rotation of the drive motor during the FF or playback operation, causes the motor torque to be transmitted only to the mode selection lever by way of another output gear of the planetary gear mechanism. Consequently, it is possible for the drive motor to have its driving gear in steady engagement with the racks of the cassette carrying mechanism and mode selection lever through the planetary gear mechanism, whereby the cassette carrying mechanism and mode selection lever can be driven reliably and noiselessly owing to the elimination of the solenoid operating noise and gear meshing noise, and the racks of the mode selection lever and cassette carrying mechanism can have reduced lengths, enabling the cassette tape player to be compact.

I claim:

1. A cassette tape player having a cassette carrying mechanism which conveys a cassette tape between an insertion position and a hold position of said player automatically, a mode selection lever which reciprocates depending on operational modes of said player, and a drive motor which drives said cassette carrying mechanism and said mode selection lever, said player further comprising:

a lock mechanism which selectively prevents movement of said mode selection lever or said cassette carrying mechanism; and a planetary gear mechanism coupled between said drive motor and said mode selection lever and cassette carrying mechanism and including a sun gear rotated by said drive motor, a ring gear which meshes with one of a first rack provided on said mode selection lever and a second rack provided on said cassette carrying mechanism, and a carrier which meshes with another of said first rack and said second rack, wherein said lock mechanism selectively prevents movement of said mode selection lever or cassette carrying mechanism so that the driving force of said drive motor applied to said sun gear is released from only one of said ring gear and said carrier.

2. A cassette tape player according to claim 1, wherein said lock mechanism is switched to a first position or second position depending on a rotational direction of said drive motor when the cassette tape is in the hold position, and at the first lock position prevents said mode selection lever from moving and at the second lock position prevents said cassette carrying mechanism from moving.

3. A cassette tape player according to claim 1, wherein said lock mechanism includes a lock lever which moves between a first and second lock positions, said lock lever in said first lock position preventing said mode selection lever from moving, said lock lever in said second lock position preventing said cassette carrying mechanism from moving.

4. A cassette tape player according to claim 3, wherein said mode selection lever, defines a cam hole which has a parallel section extending parallel to the moving direction of said mode selection lever and a step section continuous to the parallel section and extending in a direction perpendicular to the moving direction of said mode selection lever, a boss on said lock lever being inserted into said cam hole, said lock lever moving to said first lock position when said boss moves from said parallel section to the step section of said cam hole, thereby preventing said mode selection lever from moving, said lock lever moving to said second lock position when said boss moves from the step section to said parallel section, thereby allowing said mode selection lever to move.

5. A cassette tape player according to claim 3, wherein said lock lever has a stopper section which enters and leaves a moving range of said cassette carrying mechanism, said stopper section being located outside said moving range of said cassette carrying mechanism when said lock lever is located at the first lock position, thereby allowing said cassette carrying mechanism to move, said stopper section being located inside said moving range of said cassette carrying mechanism when said lock lever is located at the second lock position, thereby preventing said cassette carrying mechanism from moving.

6. A cassette tape player according to claim 3, wherein said mode selection lever defines a cam hole which has a parallel section extending in parallel to a moving direction of said mode selection lever and a step section continuous to said parallel section and extending in a direction perpendicular to the moving direction of said mode selection lever, and said lock lever has a boss inserted into said cam hole of said mode selection lever and a stopper section which can enter or leave a moving range of said cassette carrying mechanism, said lock lever moving to said first lock position when said boss of said lock lever moves from said parallel section to said step section of said cam hole, causing said stopper section to leave said moving range of said cassette carrying mechanism, thereby preventing said mode selection lever from moving and, at the same time, allowing said cassette carrying mechanism to move, said lock lever moving to said second lock position when said boss moves from the step section to said parallel section, causing said stopper section to enter said moving range of said cassette carrying mechanism, thereby allowing said mode selection lever to move and preventing said cassette carrying mechanism from moving.

7. A cassette tape player according to claim 6, wherein said lock lever is pivoted rotatably on a pivot, said boss being located in said parallel section of said cam hole of said mode selection lever when said lock lever is located at said first lock position, thereby preventing said lock lever from turning, said stopper section being located outside said moving range of said cassette carrying mechanism and confronting part of said cassette carrying mechanism which moves within said moving range when said lock lever is located at said second lock position, thereby preventing said lock lever from turning.

8. A cassette tape player according to claim 1, wherein said cassette carrying mechanism and said mode selection lever are disposed one on a front side and one on a rear side of a generally planar chassis, with said first and second racks extending in parallel to each other, and wherein said carrier and said ring gear of said planetary gear mechanism are disposed one on said front side and one on said rear side of said chassis and are in engagement with said first and second racks, respectively.

9. A cassette tape player according to claim 1, wherein said planetary gear mechanism includes said sun gear which is pivoted rotatably on a pivot and has outer teeth for receiving a drive force of said drive motor on its outer circumference and inner teeth on its inner circumference, said carrier having a gear that meshes with one of said first and second racks and at least one pivot which confronts said inner teeth of said sun gear, and is pivoted rotatably on said pivot, said ring gear being pivoted rotatably on an outer circumference of said carrier and having inner teeth which confront said inner teeth of said sun gear and outer teeth which mesh with another of said first and second racks, and a planetary gear which is pivoted rotatably on said pivot of said carrier and meshes with said inner teeth of said sun gear and said inner teeth of said ring gear.

10. A cassette tape player having a cassette carrying mechanism which conveys a cassette tape between an insertion position and a hold position of said player automatically, a mode selection lever which reciprocates depending on operational modes of such player, and a drive motor which drives said cassette carrying mechanism and said mode selection lever, said player further comprising:

a lock lever which selectively prevents movement of said mode selection lever or said cassette carrying mechanism; and a planetary gear mechanism coupled between said drive motor and said mode selection lever and cassette carrying mechanism, and including a sun gear rotated by said drive motor, a ring gear which meshes with one of a first rack provided on said mode selection lever and a second rack provided on said cassette carrying mechanism, and a carrier which meshes with another of said first rack and said second rack, said lock lever being switched to a first position or second position depending on a rotational direction of said drive motor when the cassette tape is in the hold position, and at said first lock position prevents said mode selection lever from moving and at said second lock position prevent said cassette carrying mechanism from moving.

11. A cassette tape player according to claim 10, wherein said mode selection lever defines a cam hole which has a parallel section extending parallel to a moving direction of said mode selection lever and a step section continuous to said parallel section and extending in a direction perpendicular to said moving direction of said mode selection lever, a boss on said lock lever being inserted into said cam hole, said lock lever moving to said first lock position when said boss moves from said parallel section to the step section of said cam hole, thereby preventing said mode selection lever from moving, said lock lever moving to said second lock position when said boss moves from said step section to said parallel section, thereby allowing said mode selection lever to move.

12. A cassette tape player according to claim 10, wherein said lock lever has a stopper section which can enter or leave a moving range of said cassette carrying mechanism, said stopper section being located outside said moving range of said cassette carrying mechanism when said lock lever is located at said first lock position, thereby allowing said cassette carrying mechanism to move, said stopper section being located inside said moving range of said cassette carrying mechanism when said lock lever is located at said second lock position, thereby preventing said cassette carrying mechanism from moving.

13. A cassette tape player according to claim 10, wherein said mode selection lever defines a cam hole which has a parallel section extending in parallel to a moving direction of said mode selection lever and a step section continuous to said parallel section and extending in a direction perpendicular to said moving direction of said mode selection lever, and said lock lever has a boss which is inserted into said cam hole of said mode selection lever and a stopper section which can enter or leave said moving range of said cassette carrying mechanism, said lock lever moving to said first lock position when said boss of said lock lever moves from said parallel section to said step section of said cam hole of said mode selection lever, causing said stopper section to leave said moving range of said cassette carrying mechanism, thereby preventing said mode selection lever from moving and, at the same time, allowing said cassette carrying mechanism to move, said lock lever moving to said second lock position when said boss moves from said step section to said parallel section of said cam hole, causing said stopper section to enter said moving range of said cassette carrying mechanism, thereby allowing said mode selection lever to move and, at the same time, preventing said cassette carrying mechanism from moving.

14. A cassette tape player according to claim 13, wherein said lock lever is pivoted rotatably on a pivot, said boss being located in said parallel section of said cam hole of said mode selection lever when said lock lever is located at said first lock position, thereby preventing said lock lever from turning, said stopper section being located outside said moving range of said cassette carrying mechanism and confronting part of said cassette carrying mechanism which moves within said moving range when said lock lever is located at said second lock position, thereby preventing said lock lever from turning.

15. A cassette tape player according to claim 10, wherein said cassette carrying mechanism and said mode selection lever are disposed one on a front side and one on a rear side of a generally planar chassis, with said first and said second racks extending in parallel to each other, and wherein said carrier and said ring gear of said planetary gear mechanism are disposed one on the front side and one on the rear side of said chassis and are in engagement with said first and second racks, respectively.

16. A cassette tape player according to claim 10, wherein said planetary gear mechanism includes said sun gear which is pivoted rotatably on a pivot and has outer teeth for receiving a drive force of said drive motor on its outer circumference and inner teeth on its inner circumference, said carrier having a gear that meshes with one of said first and said second racks and at least one pivot which confronts said inner teeth of said sun gear, and is pivoted rotatably on said pivot, said ring gear being pivoted rotatably on the outer circumference of said carrier and having inner teeth which confront said inner teeth of said sun gear and outer teeth which mesh with another of said first and said second racks, and a planetary gear which is pivoted rotatably on said pivot of said carrier and meshes with said inner teeth of said sun gear and said inner teeth of said ring gear.

17. A cassette tape player comprising:

a cassette carrying mechanism which conveys a cassette tape between an insertion position and a hold position of said player;

a mode selection lever which reciprocates depending on operational modes of said player and defines a cam hole which has a parallel section extending in parallel to a moving direction of said mode selection lever and a step section continuous to said parallel section and extending in a direction perpendicular to a moving direction of said mode selection lever;

a drive motor which drives said cassette carrying mechanism and said mode selection lever;

a lock lever which has a boss inserted into said cam hole of said mode selection lever and a stopper section which can enter or leave a moving range of said cassette carrying mechanism, and selectively prevents the movement of said mode selection lever or said cassette carrying mechanism; and a planetary gear mechanism coupled between said drive motor and said mode selection lever and cassette carrying mechanism, and including a sun gear rotated by said drive motor, a ring gear which meshes with one of a first rack provided on said mode selection lever and a second rack provided on said cassette carrying mechanism, and a carrier which meshes with another of said first rack and second rack, wherein said lock lever moves to said first lock position when said boss of said lock lever moves from the parallel section to said step section of said cam hole of said mode selection lever, causing said stopper section of said lock lever to leave said moving range of said cassette carrying mechanism, thereby preventing said mode selection lever from moving and allowing said cassette carrying mechanism to move, said lock lever moving to said second lock position when said boss moves from the step section to the parallel section of said cam hole, causing said stopper section to enter said moving range of said cassette carrying mechanism, thereby allowing said mode selection lever to move and preventing said cassette carrying mechanism from moving.

18. A cassette tape player according to claim 17, wherein said lock lever is switched to a first or second position depending on a rotational direction of said drive motor when said cassette tape is in the hold position.

19. A cassette tape player according to claim 17, wherein said lock lever is pivoted rotatably on a pivot, said boss being located in said parallel section of said cam hole of said mode selection lever when said lock lever is located at said first lock position, thereby preventing said lock lever from turning, said stopper section being located outside said moving range of said cassette carrying mechanism and confronting part of said cassette carrying mechanism which moves within said moving range when said lock lever is located at said second lock position, thereby preventing said lock lever from turning.

20. A cassette tape player according to claim 17, wherein said cassette carrying mechanism and said mode selection lever are disposed one on a front side and one on a rear side of a generally planar chassis, with said first and said second racks extending in parallel to each other, and wherein said carrier and said ring gear of said planetary gear mechanism are disposed one on the front side and one on the rear side of said chassis and are in engagement with said first and said second racks, respectively.

21. A cassette tape player according to claim 17, wherein said planetary gear mechanism includes said sun gear which is pivoted rotatably on a pivot and has outer teeth for receiving a drive force of said drive motor on its outer circumference and inner teeth on its inner circumference, said carrier having a gear that meshes with one of said first and said second racks and at least one pivot which confronts said inner teeth of said sun gear, and is pivoted rotatably on said pivot, said ring gear being pivoted rotatably on the outer circumference of said carrier and having inner teeth which confront said inner teeth of said sun gear and outer teeth which mesh with another of said first and said second racks, and a planetary gear which is pivoted rotatably on said pivot of said carrier and meshes with said inner teeth of said sun gear and said inner teeth of said ring gear.

* * * * *